United States Patent
Podda et al.

(10) Patent No.: US 12,428,144 B2
(45) Date of Patent: Sep. 30, 2025

(54) ANTI-TORQUE ROTOR FOR A HELICOPTER

(71) Applicant: LEONARDO S.P.A., Rome (IT)

(72) Inventors: Daniele Podda, Samarate (IT); Alessandro Rutilio, Samarate (IT); Stefano Poggi, Samarate (IT); Fabrizio Losi, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/646,214

(22) Filed: Apr. 25, 2024

(65) Prior Publication Data

US 2024/0270380 A1    Aug. 15, 2024

Related U.S. Application Data

(62) Division of application No. 17/621,475, filed as application No. PCT/IB2020/054982 on May 26, 2020, now Pat. No. 12,091,168.

(30) Foreign Application Priority Data

Jun. 26, 2019   (EP) .................................. 19182720

(51) Int. Cl.
*B64C 27/82* (2006.01)
*B64C 27/59* (2006.01)
*B64C 27/72* (2006.01)

(52) U.S. Cl.
CPC .............. *B64C 27/82* (2013.01); *B64C 27/72* (2013.01); *B64C 27/59* (2013.01)

(58) Field of Classification Search
CPC ......... B64C 27/59; B64C 27/72; B64C 27/78; B64C 27/82; B64C 27/605
See application file for complete search history.

(56) References Cited

U.S. PATENT DOCUMENTS

| 3,811,742 A | 5/1974 | Rosales |
| 9,359,073 B2 | 6/2016 | Hewitt |

(Continued)

FOREIGN PATENT DOCUMENTS

FR       3072939        5/2019

OTHER PUBLICATIONS

International Search Report and Written Opinion in PCT Application No. PCT/IB2020/054982, mailed Sep. 10, 2020.

(Continued)

*Primary Examiner* — Joshua D Huson
(74) *Attorney, Agent, or Firm* — Leason Ellis LLP

(57) ABSTRACT

An anti-torque rotor includes a mast rotatable about a first axis; a plurality of blades; an element slidable along the first axis, rotating integrally with the mast and operatively connected to the blades. The rotor also has a slidable control rod; a first bearing with a rotatable first ring, a second ring radially internal to the first ring and a plurality of first rolling bodies; a third ring slidable along the first axis and angularly fixed with respect to the first axis; and a locking element arranged in a first configuration, in which it prevents the relative rotation of the second and third rings and is movable from the first configuration to at least one emergency configuration, in which it renders the second ring free to rotate with respect to the third ring, when the first bearing is in a failure condition.

13 Claims, 13 Drawing Sheets

(56) References Cited

U.S. PATENT DOCUMENTS

2016/0152332 A1    6/2016  Certain
2019/0276144 A1*   9/2019  Mullen .................. B64C 27/59

OTHER PUBLICATIONS

International Preliminary Report on Patentability in PCT Application No. PCT/IB2020/054982, mailed Sep. 17, 2021.
Non-Final Office Action in U.S. Appl. No. 18/646,221, mailed Feb. 26, 2025 (25 pages).

* cited by examiner

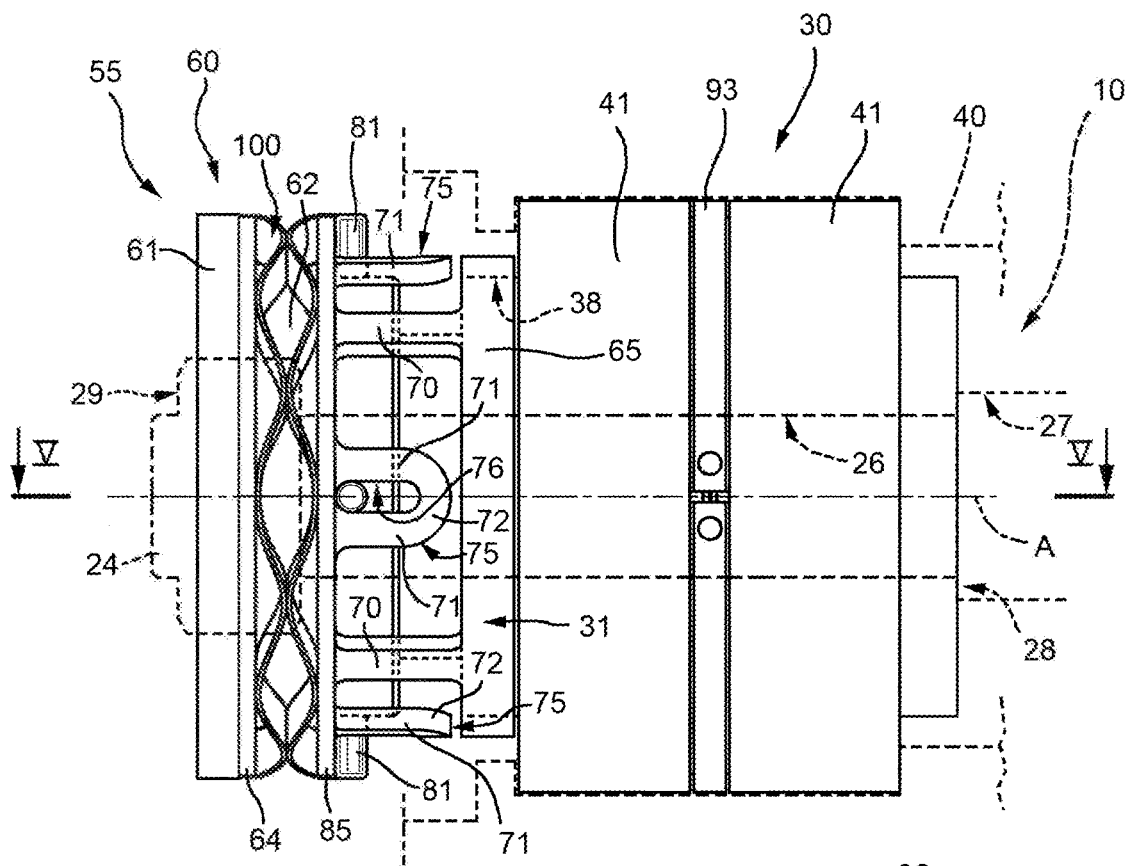
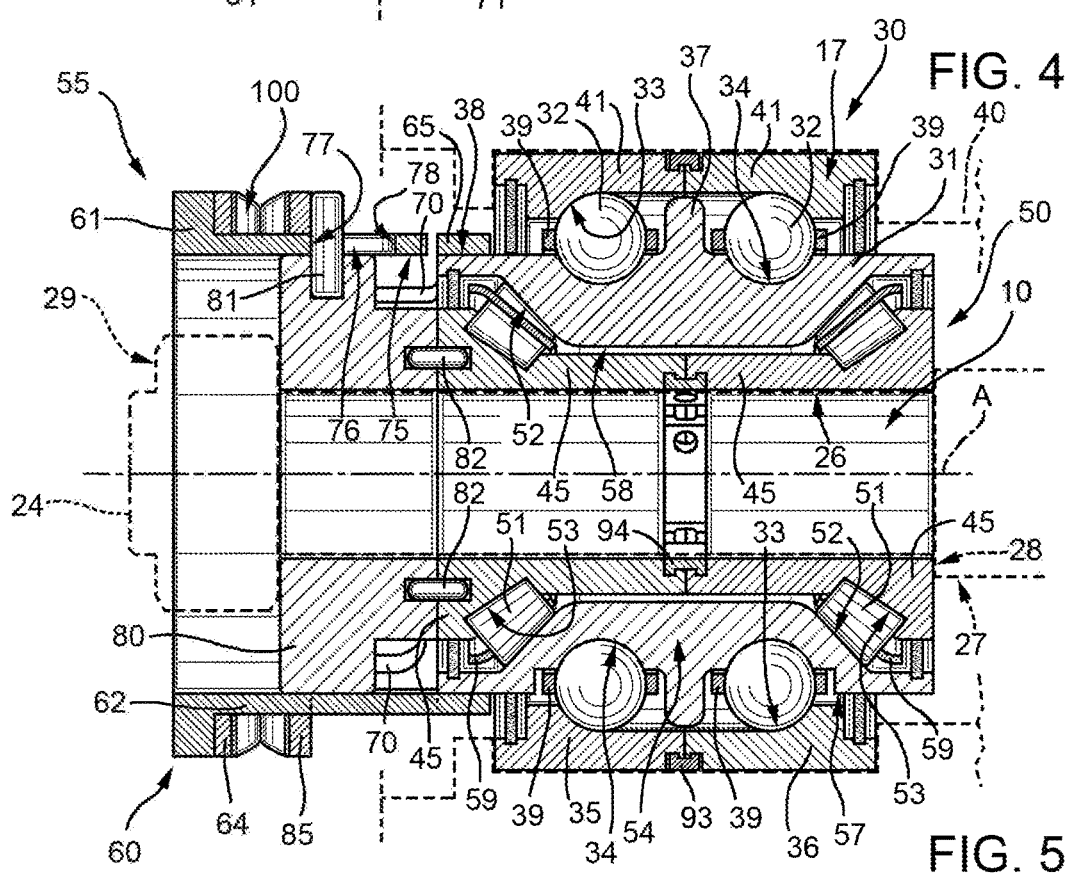
FIG. 4
FIG. 5

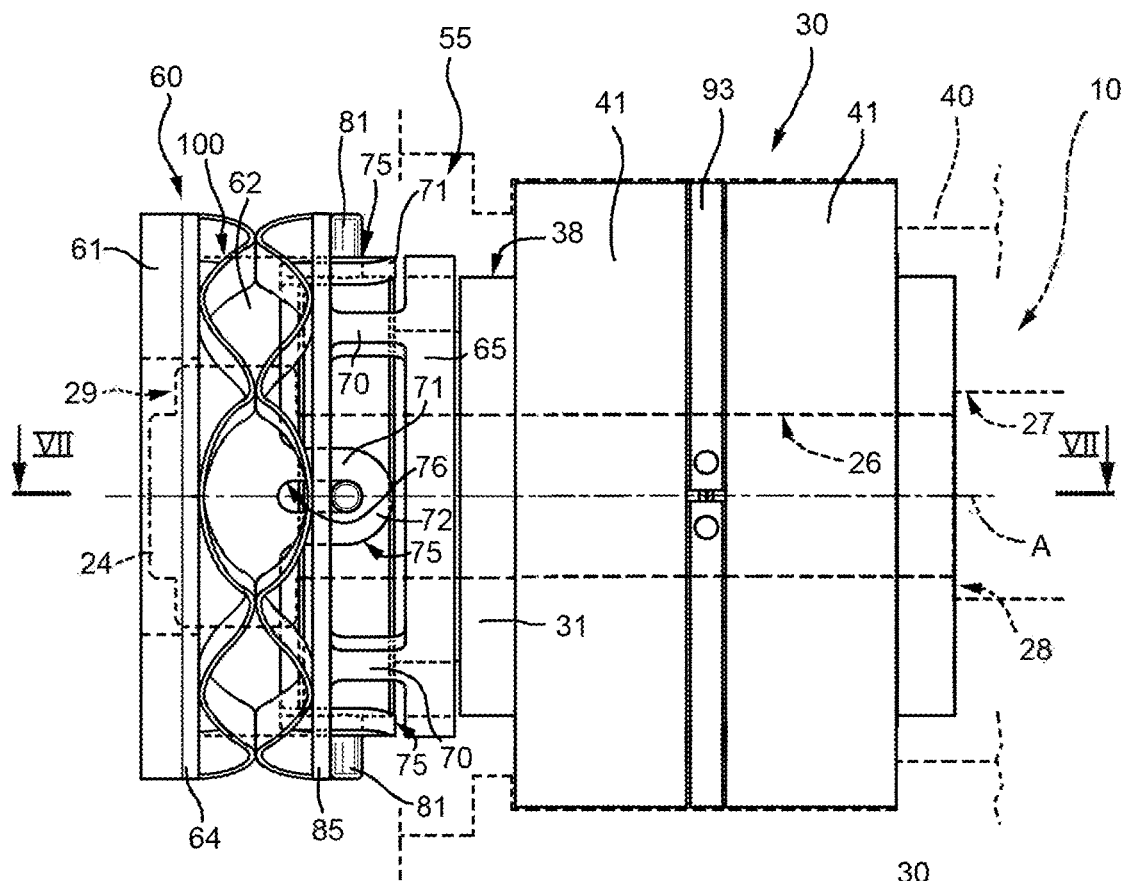
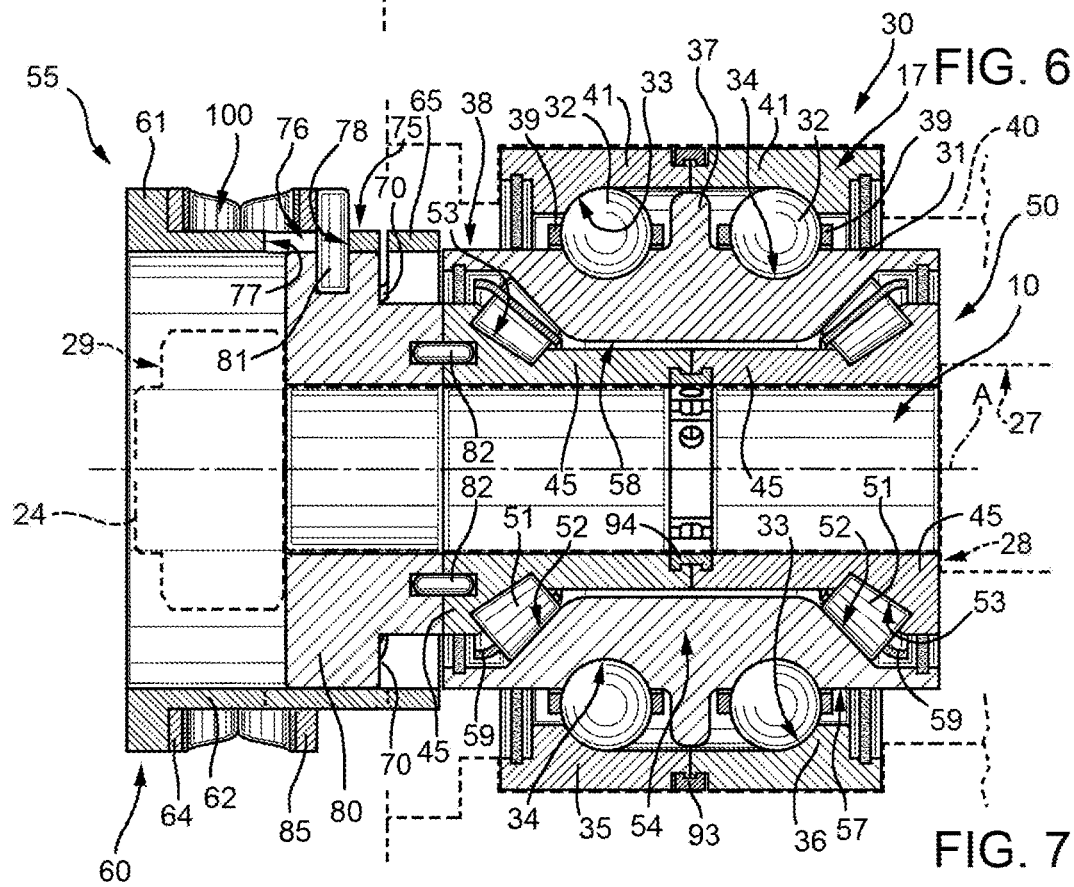
FIG. 6
FIG. 7

US 12,428,144 B2

ANTI-TORQUE ROTOR FOR A HELICOPTER

CROSS-REFERENCE TO RELATED APPLICATIONS

This patent application is a divisional of U.S. application Ser. No. 17/621,475, filed Dec. 21, 2021, which is a U.S. National Phase Application under 35 U.S.C. § 371 of International Patent Application No. PCT/IB2020/054982, filed on May 26, 2020, which claims priority from European patent application no. 19182720.3, filed on Jun. 26, 2019, all of which are incorporated by reference, as if expressly set forth in their respective entireties herein.

TECHNICAL FIELD

The present invention relates to an anti-torque rotor for a helicopter.

BACKGROUND ART

Helicopters are known to basically comprise a fuselage, a main rotor positioned on the top of the fuselage and rotatable about an axis thereof, and an anti-torque rotor arranged at the tail end of the fuselage.

Helicopters also comprise, in a known manner, one or more power units, such as turbines for example, and a transmission unit interposed between the turbines and the main rotor and adapted to transmit motive power from the turbines to the main rotor itself.

In greater detail, the anti-torque rotor, in turn, basically comprises:

a mast rotatable about a first axis;
a hub rotatable about the first axis; and
a plurality of blades hinged on said hub, projecting in a cantilever fashion from the hub and each extending along respective second axes transversal to the first axis.

The mast of the anti-torque rotor is driven in rotation by a set of gears driven by the main transmission unit.

The blades of the anti-torque rotor rotate integrally with the mast about the first axis and can be selectively tilted about the second axis, so as to be able to vary the respective angles of attack and consequently adjust the thrust exerted by the anti-torque rotor.

In order to adjust the angles of attack of the respective blades, anti-torque rotors comprise:

a rod, operatively connected to a pedal operable by the pilot through a mechanical connection or fly-by-wire link and sliding inside the mast along the first axis, but angularly fixed with respect to the first axis;
a control element, also known as a "spider", integrally rotatable with the mast about the first axis and equipped with a plurality of arms connected to respective blades in an eccentric position with respect to the associated second axes; and
a rolling bearing, mounted in a sliding manner with respect to first axis, interposed between the rod and the control element, and configured so as to transmit an axial load from the rod to the rotatable element.

More specifically, the rolling bearing, in turn, comprises:
a radially outer ring fastened on the control element;
a radially inner ring fastened to the control rod; and
a plurality of rolling bodies, which roll in respective tracks defined by the radially inner and outer rings.

In a normal operating condition of the bearing, the rolling bodies allow rotation of the outer ring with respect to the inner ring and the consequent rotation of the control element with respect to the rod.

Operation of the pedal causes the control rod to slide parallel to the first axis. This sliding causes, via the rolling bearing, the control element to slide parallel to the first axis along a given path of travel.

This sliding causes rotation of the blades about the associated second axes, so as to vary the respective angles of attack by equal amounts associated with the given path of travel.

From the foregoing, it follows that a possible failure of the rolling bearing would risk making the anti-torque rotor substantially uncontrollable, causing a hazardous situation for the helicopter.

In particular, a failure situation might occur in the case where rolling bodies and/or the tracks of the inner or outer ring become damaged, for example due to the accidental introduction of foreign bodies inside the bearing, the loss of lubricating grease, damage to the tracks or surfaces of the rolling bodies.

In this condition, instead of allowing the relative rotation of the control element to the control rod, the rolling bearing would improperly transfer a twisting moment, progressively growing over time, from the outer ring to the inner ring.

This twisting moment would be transmitted to the control rod, generating a risk of damaging the control rod.

The failure condition of the rolling bearing is normally preceded by an increase in the torque acting on the inner ring and an increase in temperature and vibrations in the area around the rolling bearing.

There is awareness in the industry of the need to reduce the risk of these failure conditions making regulation of the blades' angle of attack ineffective, thereby making the thrust of the anti-torque rotor and the yaw angle of the helicopter substantially uncontrollable.

There is also awareness in the industry of the need to ensure correct control of the anti-torque rotor, even in the event of failure of the rolling bearing.

Finally, there is awareness in the industry of the need to promptly identify the incipient failure state of the rolling bearing and to provide a clear and immediate indication to the crew.

U.S. Pat. No. 9,359,073 describes an anti-torque rotor for a helicopter.

In greater detail, U.S. Pat. No. 9,359,073 describes an anti-torque rotor comprising a mast, a rod, and a first and second bearing arranged in series.

The first bearing comprises a first ring rotatable with the mast and a second ring.

The second bearing comprises a third ring and a fourth ring.

The third ring of the second bearing and the first ring of the first bearing are connected to each other in a non-rotatable manner.

In particular, the first and the second ring respectively define a first and a second track for first rolling bodies of the first bearing.

The third and the fourth ring respectively define a third and a fourth track for the second rolling bodies.

In other words, each first, second, third and fourth ring define a respective first, second, third and fourth track. The anti-torque rotor also comprises a locking device interposed between the third and the fourth rings and adapted to prevent rotation of the third ring with respect to fourth ring. This locking device comprises an element that is breakable in the case of the first bearing failure and not breakable in the case of correct operation of the first bearing.

The solution shown in U.S. Pat. No. 9,359,073 is particularly complex as it requires using two rolling bearings and a locking device.

In particular, the solution shown in U.S. Pat. No. 9,539,073 requires four rings for defining four tracks and the first and the second bearing are axially spaced with respect to one another.

This renders the solution shown in U.S. Pat. No. 9,539,073 particularly cumbersome and unsuitable to be easily fitted in the reduced axial size of the tail rotor of the helicopter.

Furthermore, both the first and the second bearing comprise a single ring of spherical rolling bodies.

Having the single ring of rolling bodies a small rotation stiffness, the breakable element of the locking device can only transmit axial loads parallel to the rotation axis of the mast.

Accordingly, the solution shown in U.S. Pat. No. 9,539,073 is effective substantially in transmitting loads parallel to the rotation axis of the mast only.

Furthermore, the use of a single ring of spherical rolling bodies inevitably causes the presence of axial loads, which can result in annoying vibrations and noise.

Furthermore, due to the presence of a single ring of spherical rolling bodies, the bearings of renders are particularly exposed to the false brinelling wear damage mechanism, i.e. to the occurrence of hollow spots that resemble brinell dents and are due to wear caused by vibration and swaying at the contact points between the rolling bodies and the tracks.

DISCLOSURE OF INVENTION

The object of the present invention is to provide an anti-torque rotor that enables satisfying at least one of the aforementioned needs in a simple and inexpensive manner.

The aforesaid object is achieved by the present invention, in so far as it relates to an anti-torque rotor as defined herein.

BRIEF DESCRIPTION OF THE DRAWINGS

For a better understanding of the present invention, three preferred embodiments are described hereinafter, purely by way of non-limitative example and with reference to the accompanying drawings, in which:

FIG. 4 is a side view of the components of FIG. 3 in a standard configuration;

FIG. 5 is a section along line V-V of FIG. 4 in the standard configuration;

FIG. 6 is a side view of the component of FIGS. 3 and 5 in a first emergency configuration;

FIG. 7 is a section along line VII-VII of FIG. 6 in the first emergency configuration;

BEST MODE FOR CARRYING OUT THE INVENTION

Figure 1:
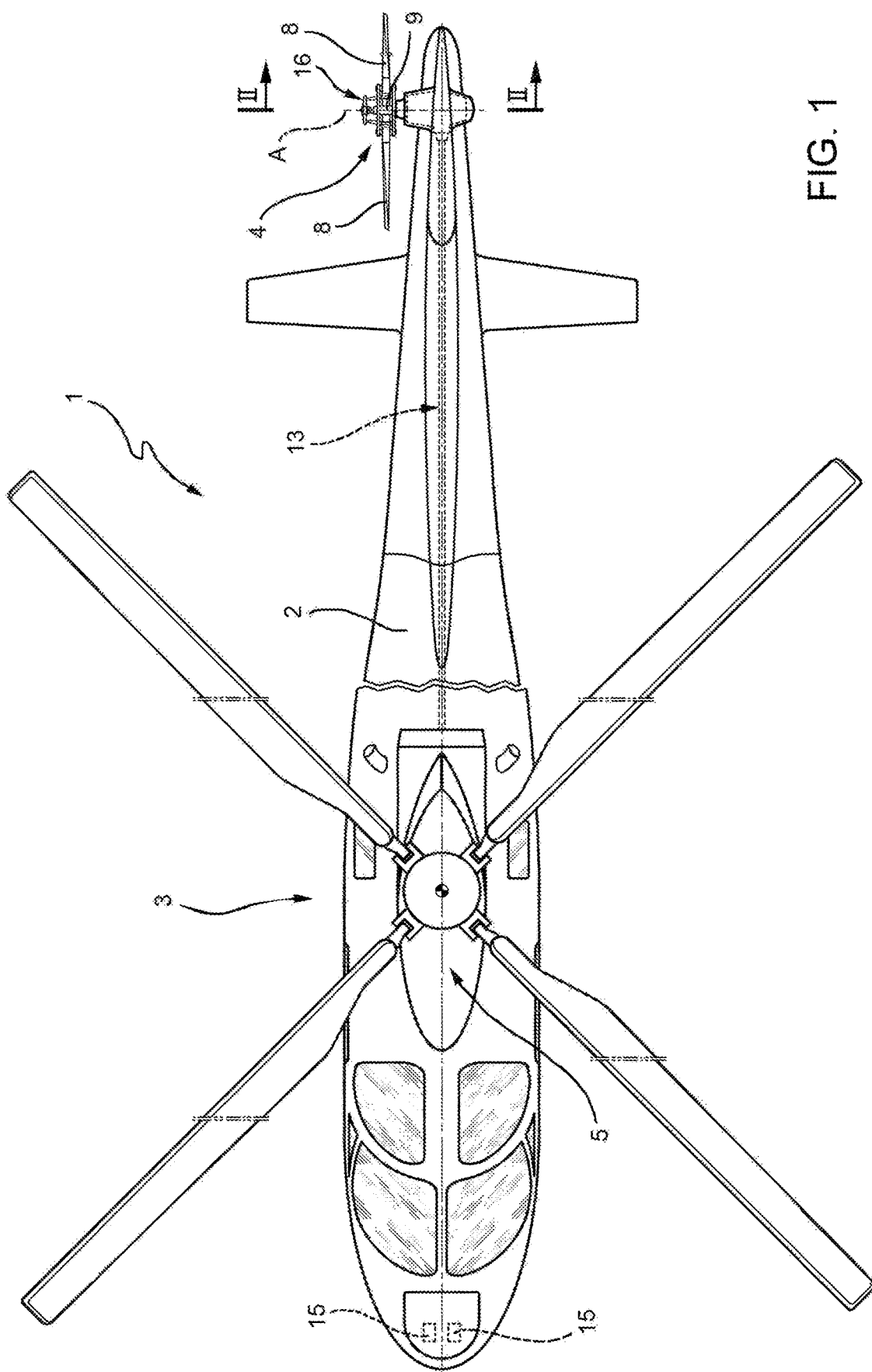
FIG. 1 is a top view of a helicopter comprising an anti-torque rotor according to a first embodiment of the present invention.

Referring to FIG. 1, reference numeral 1 indicates a helicopter basically comprising:
- a fuselage 2;
- one or more turbines 5;
- a main rotor 3 positioned on the top of the fuselage 2 and rotatable about an axis A; and
- an anti-torque rotor 4 located at a tail end of the fuselage 2 and rotatable about an axis thereof, transversal to axis A.

The helicopter 1 also comprises a transmission unit, in itself known and not shown, which transmits motive power from the turbines 5 to the main rotor 3.

In turn, the transmission unit comprises:
- a gear train, which transmits motive power from the turbine 5 to the main rotor 3; and
- a shaft 13, which transmits motive power from the gear train 12 to the anti-torque rotor 4.

In a known manner, the main rotor 3 is adapted to provide orientable thrust that enables lift-off and forward flight of the helicopter 1.

The anti-torque rotor 4 generates a thrust, which causes a counter torque on the fuselage 2.

This counter torque is directed in the opposite direction to the torque exerted by the main rotor 3.

According to the amount of thrust generated by the anti-torque rotor 4, it is therefore possible to orientate the helicopter 1 according to a desired yaw angle, or vary said yaw angle depending on the manoeuvre that it is wished to perform.

Referring to FIGS. 2 to 11, the anti-torque rotor 4 basically comprises:
- a mast 6 rotatable about an axis A and operatively connected to the shaft 13 in a known manner;
- a plurality of blades 8, three in number in the case shown, which extend in a cantilever fashion along respective axes B transversal to the axis A; and
- a hub 9 externally fastened to a portion of the mast 6, integrally rotatable with the mast 6 about axis A and on which the blades 8 are hinged.

More specifically, the blades 8 are hinged on the hub 9 so as to be:
- integrally rotatable with the hub 9 and the mast 6 about axis A; and tiltable about their respective axes B by the same angles and simultaneously over time, so as to vary the respective angles of attack.

In particular, the hub 9 comprises a plurality of connection elements 18 projecting radially with respect to axis A for connection to the respective blades 8. Each blade 8 also comprises a root portion 14 arranged radially inward with respect to the axis A and hinged on the associated connection element 18 of the hub 9.

In order to vary the aforementioned angles of attack, the anti-torque rotor 4 also comprises:
- a flight control 15 (only schematically shown in FIG. 1) operable by the pilot, for example a pedal;
- a control rod 10 sliding parallel to the axis A and operable by the flight control 15, by means of a mechanical connection or a fly-by-wire method;
- a control element 16 rotatable integrally with the mast 6 about axis A and connected to the blades 8 in an eccentric manner with respect to the associated axes B; and
- a bearing 17 interposed between the control rod 10 and element 16 and sliding, jointly with the control rod 10, parallel to axis A.

More specifically, the mast 6 is hollow.

The mast 6 also comprises (FIG. 2):
an axial end 20;
a further axial end, not shown, open and opposite to end 20; and
a main portion 22 interposed between the axial end 20 and the further axial end, on which the hub 9 is fitted, and adapted to receive motive power from the shaft 13 (FIG. 1) via a flange 19.

The control rod 10 is partly housed inside the mast 6.
The control rod 10 also comprises:
a first axial end (not shown) and connected to the shaft 13;
a second axial end 24 (FIG. 2) connected to the bearing 17 and opposite to the first axial end; and
a main body 25 passing through the end 20 and the further axial end of the mast 6.

The main body 25 further comprises, starting from end 24 and proceeding along the axis A:
a segment 26 of larger diameter than end 24;
a segment 27 of larger diameter than segment 26; and
a shoulder 28 radially interposed between segments 26 and 27.

End 24 is arranged externally to the mast 6.

The first end is operatively connected to the flight control 15 by a linkage (not shown) or by a fly-by-wire type of activation.

Element 16, in turn, comprises (FIG. 2):
a tubular body 40, partly housed in the mast 6 and connected to the mast 6 in a sliding manner with respect to axis A, and partly housing the control rod 10;
a flange 42 extending orthogonally to axis A and fastened to the tubular body 40 on the end opposite to the mast 6; and
a plurality of levers 43 hinged on the flange 42 about respective axes C transversal to axis A and hinged on respective blades 8 in eccentric positions with respect to the associated axes B.

The flange 42 and the bearing 17 are housed outside the mast 6 and surround the control rod 10.

The flange 42 is connected to the mast 6 by a single variable-length bellows coupling 44, which enables sliding along the axis A.

The levers 43 are generally inclined with respect to axis A and extend from the flange 42 towards the end 20.

The translation of the control rod 10 along axis A causes, via the bearing 17, the translation of element 16.

Following the sliding of element 16 along axis A, the levers 43 change their inclination with respect to axis A by the same mutually identical angles, causing the simultaneous rotation of the blades 8 about their respective axes B by the same mutually equal angles.

In particular, the levers 43 are hinged on the root portions 14 of the respective blades 8.

The bearing 17 is able to transmit axial loads parallel to axis A in both directions.

In other words, the bearing 17 is configured so that translation of the control rod 10 along axis A in both directions causes the translation of element 16 in the same directions.

In this way, the bearing 17 connects the control rod 10 and element 16 in an axially integral and angularly movable manner with respect to axis A.

The bearing 17, in turn, comprises:
a radially outer ring 30 integrally rotatable with element 16;
a radially inner ring 31 integrally sliding with the control rod 10; and
a plurality of rolling bodies 32, a double ring of balls in the case shown, rolling on respective tracks 33 and 34 defined by the respective rings 30 and 31.

In the case shown, the ring 30 has a pair of shoulders 35 and 36 at mutually opposite sides, projecting radially towards ring 31 and defining respective axial abutment surfaces for the rolling bodies 32. The shoulders 35 and 36 define track 33.

The rolling bodies 32 are, in particular, axially interposed between the shoulders 35 and 36.

Furthermore, ring 30 is made in two half-rings 41, arranged axially in contact with each other in the case shown.

Ring 30 is force-fitted, in a radially outer position, on the tubular body 40 of element 16.

Ring 31 comprises a shoulder 37 axially interposed between shoulders 35 and 36, projecting radially towards ring 30. These shoulder 37 is axially interposed between the rolling bodies 32 on a plane of symmetry of the bearing 17 radial to axis A.

Furthermore, the ring 30 is fastened on the tubular body 40 of element 16 on the opposite side to flange 42 in a direction radial to axis A.

The bearing 17 also comprises two annular cages 39 adapted to keep the rolling bodies 32 of the respective rings angularly and equispaced from each other.

Ring 31 is radially inner with respect to ring 30 relative to axis A.

In particular, track 34 is radially inner with respect to track 33 relative to axis A.

Hereinafter in this description, the term "failure" of the bearing 17 means any effective or incipient emergency condition in which the bearing 17 is no longer able to transmit only an axial load from the control rod 10 to element 16, i.e. causing axial translation of element 16 in both directions, following the axial translation of the control rod 10, without generating any twisting moment on the control rod 10.

By way of non-limitative example, a first (incipient) emergency condition arises when the rolling bodies 32 and/or the tracks 33 and 34 become damaged, for example, due to foreign bodies accidentally entering the bearing 17 or the loss of lubricating grease.

In this first emergency condition, ring 31 of the bearing 17 is subjected to a twisting moment.

Furthermore, the first emergency condition of the bearing 17 is generally associated with an increase in temperature and/or vibration level of the area around the bearing 17 and/or of the torque transmitted to the ring 31.

A second emergency condition arises when the rolling bodies 32 of the bearing 17 break, such that the control rod 10 becomes axially movable with respect to element 16.

The anti-torque rotor 4 also advantageously comprises:
- a further ring 50 sliding integrally with said control rod 10 along axis A and angularly fixed with respect to axis A;
- a plurality of rolling bodies 51, which are interposed between said rings 31 and 50 and roll on respective tracks 52 and 53 of the respective rings 31 and 50; and
- a locking element 55 arranged in a standard configuration, in which it prevents the relative rotation of the rings 31 and 50, when the bearing 17 is in a normal operating condition;
- the locking element 55 is movable from the standard configuration to at least a first or second emergency configuration, in which it renders ring 50 free to rotate with respect to ring 31 about axis A, when the bearing 17 is in the failure condition.

In particular, rings 30, 31, 50 are coaxial and extend about axis A.

Still more precisely, ring 50 is radially inner with respect to ring 31 relative to axis A.

Furthermore, track 53 is radially inner with respect to track 52 relative to axis A.

In particular, ring 31 is formed in a one-piece and integrally defines tracks 34, 52.

In greater detail, when the bearing 17 is in a normal operating condition and the locking element 55 is in the standard configuration, ring 30 rotates about axis A and rings 31 and 50 are angularly fixed with respect to axis A.

In this situation, ring 50 is substantially inactive.

Contrariwise, when the bearing 17 is in a failure condition and the locking element 55 is in the first or second emergency configurations, rings 30 and 31 rotate about axis A and ring 50 is angularly fixed with respect to axis A. In this condition, the set of rings 30 and 31 and ring 50 form a backup bearing 54 (FIGS. 5, 7, 9 and 10), which enables control of the anti-torque rotor 4 even in failure conditions of the bearing 17.

In greater detail, the locking element 55 automatically moves from the standard configuration to the first emergency configuration when, in the event of failure of the bearing 17, the temperature of the bearing 17 exceeds a respective threshold value.

The locking element 55 automatically moves from the standard configuration to the second emergency configuration when, in the event of failure of the bearing 17, the vibrations in the area of the bearing 17 exceed a respective threshold value and/or the torque transmitted from ring 30 to ring 31 exceeds a respective threshold value.

The backup bearing 54 is able to transmit axial loads parallel to axis A in both directions. In other words, the backup bearing 54 is configured so that the translation of the control rod 10 along axis A in both directions continues to cause the translation of element 16 in the same directions, even in the event of failure of the bearing 17.

Ring 50 also comprises:
- a radially outer surface 57, which comprises two shoulders axially opposing each other, inclined with respect to axis A and defining respective tracks 52 and 53; and
- a radially inner surface 58, opposite to surface 57 and force-fitted on segment 26 of the control rod 10.

The rolling bodies 51 are, in the case shown, conical rollers with respective lateral surfaces convergent towards axis A. In particular, the conical rollers are arranged in an X, i.e. with the respective axes converging on axis A.

The backup bearing 54 further comprises two annular cages 59 adapted to keep the rolling bodies 51 of the respective rings angularly and evenly spaced out from each other.

Furthermore, in the case shown, ring 50 is made in two half-rings 45 arranged in contact with one another axially.

The locking element 55 is angularly fixed with respect to axis A, both in the standard configuration and in the first or second emergency configurations.

When arranged in the standard configuration, the locking element 55 is axially integral with rings 31 and 50 and with the control rod 10.

When arranged in the first or second emergency configuration, the locking element 55 can instead slide parallel to axis A with respect to rings 31 and 50 and the control rod 10.

More specifically, the locking element 55 is arranged with respect to rings 31 and 50 and with reference to axis A:
- in an inserted position (FIGS. 4 and 5), reached when the locking element 55 is in the standard configuration; and
- in an extracted position (FIGS. 6 to 9), reached when the locking element 55 is arranged in the first or second emergency configuration.

A first axial distance between the locking element 55 set in the inserted position and the rings 31 and 50 is less than a second axial distance between the locking element 55 set in the extracted position and the rings 31 and 50.

The locking element 55 is arranged on the axial side of the bearing 17 opposite to the mast 6.

In greater detail, the locking element 55 extends annularly about axis A and comprises (FIGS. 3 to 9):
- a main body 60;
- a ring 65 axially spaced apart from the main body 60; and
- a plurality of arms 70 angularly and evenly spaced around axis A and interposed between the main body 60 and ring 65.

When the locking element 55 is in the standard configuration (FIGS. 4 and 5):
- ring 65 is blocked by interference on a surface 38 of ring 31 radially external with respect to axis A; and
- the arms 70 connect the main body 60 and ring 65.

In this standard configuration, ring 65 prevents the rotation of ring 31, due to the radial interference between ring 65 and surface 38.

In particular, ring 65 is also blocked by radial interference on surface 38 by the part axially opposite to the mast 6.

In the case shown, ring 65 surrounds and touches surface 38.

Referring to FIGS. 6 and 7, when the locking element 55 is in the first emergency configuration, ring 65 is disengaged from surface 38 of ring 31, which thus becomes free to rotate about axis A integrally with ring 30 under the twisting moment improperly transmitted by ring 31.

Figure 8:
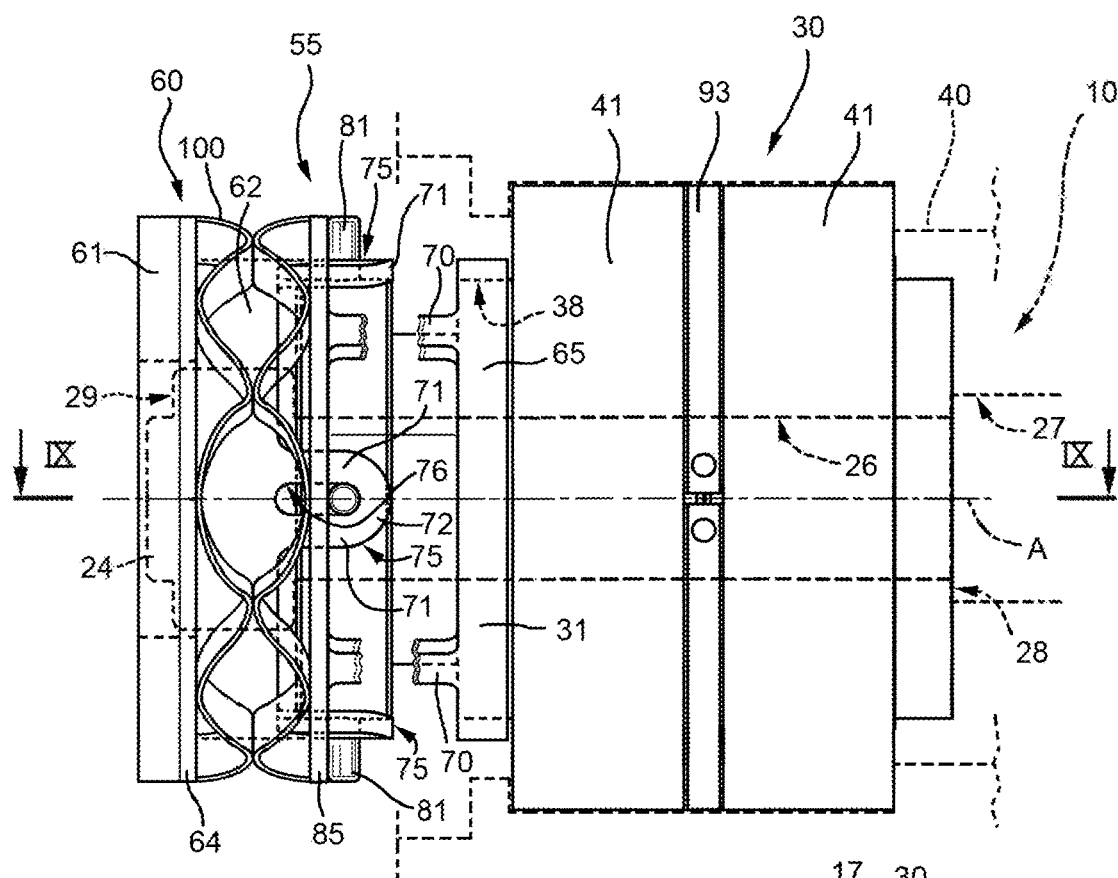
FIG. 8 is a side view of the component of FIGS. 3 to 7 in a second emergency configuration.
Figure 9:
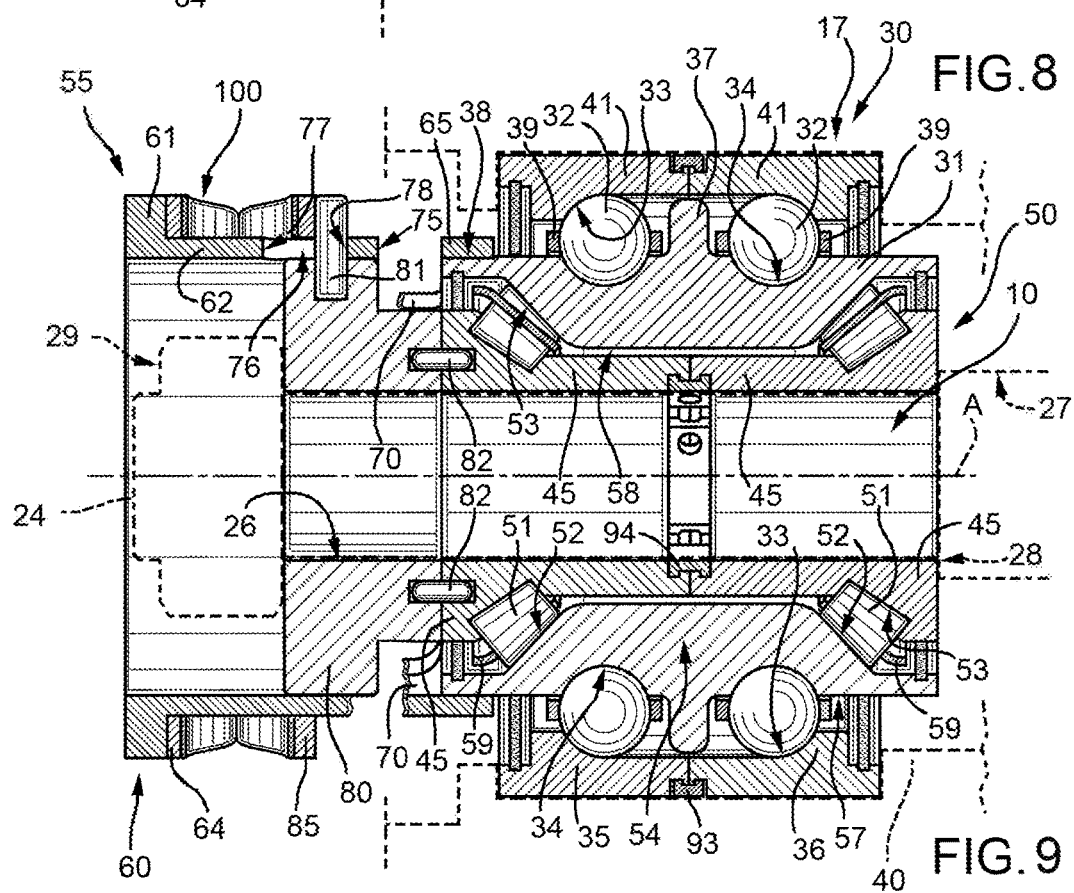
FIG. 9 is a section along line IX-IX of FIG. 8 in the second emergency configuration.
Figure 10:
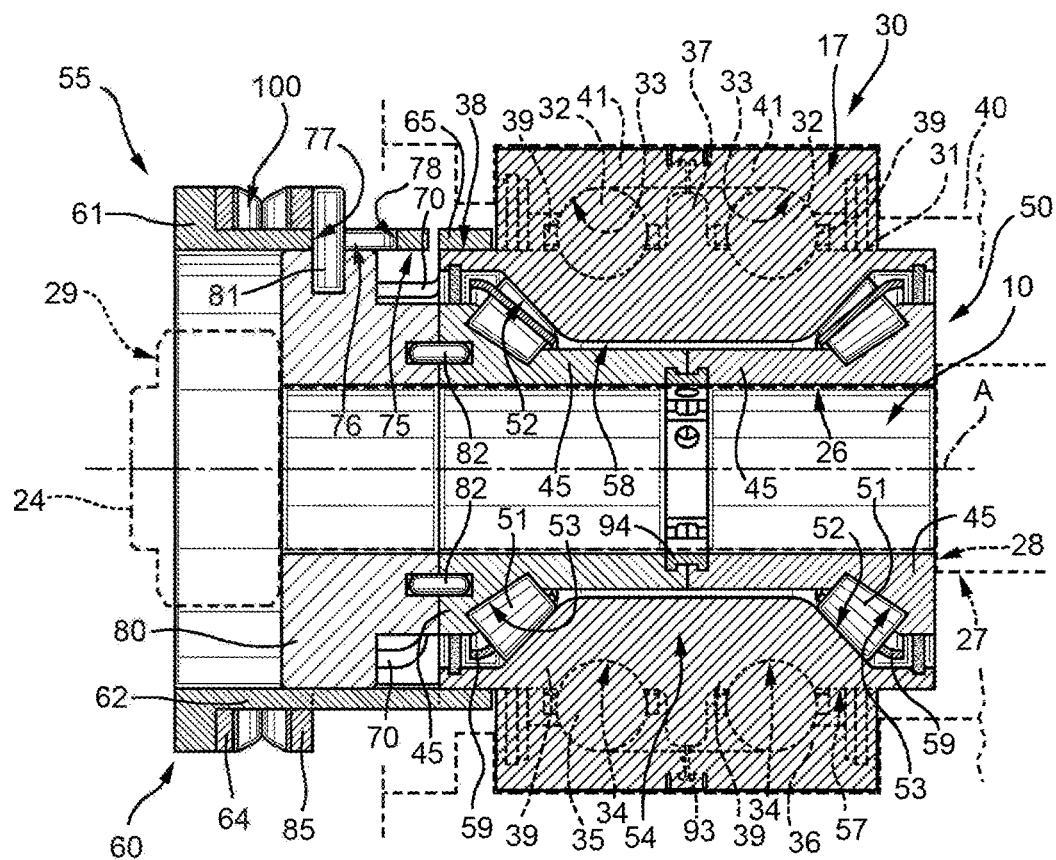
FIG. 10 is the section of FIG. 5, with hatched parts for the sake of clarity.
Figure 11:
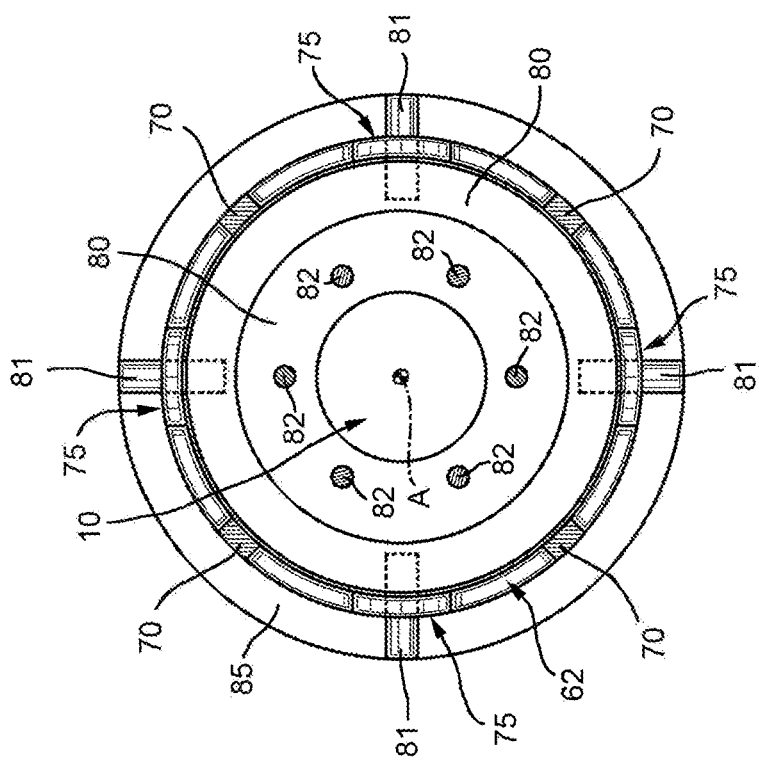
FIG. 11 is a section along line XI-XI of FIG. 3.

Referring to FIGS. 8 and 9, when the locking element 55 is in the second emergency configuration, the arms 70 are interrupted and no longer connect the main body 60 and ring 65. Even in this second emergency configuration of the locking element 55, ring 31 becomes free to rotate about axis A integrally with ring 30 under the twisting moment improperly transmitted by ring 31.

The locking element 55 is made of a material having a first thermal expansion coefficient, and ring 50 is made of a material having a second thermal expansion coefficient, lower than the first thermal expansion coefficient.

The first thermal expansion coefficient is greater than the second thermal expansion coefficient.

In the case shown, the locking element 55 is made of aluminium and rings 30, 31 and 50 are made of steel.

Therefore, in the event of a temperature increase of the bearing 17 due to its failure that is above the threshold value, ring 65 radially dilates more than surface 38 of ring 50 until it is radially separated from ring 50.

Once ring 65 leaves surface 38 free, the locking element 55 is arranged in the first emergency configuration.

The arms 70 are sized so as to break under torsion, when the vibrations and/or twisting moment transmitted to ring 31 exceed a threshold value.

In this way, the locking element 55 moves from the standard configuration to the second emergency configuration (FIGS. 8 and 9), when the vibrations and/or twisting moment transmitted to ring 31 exceed a threshold value.

Furthermore, the arms 70 are angularly and evenly spaced around axis A and extend parallel to axis A.

The main body 60 also comprises:
a cylindrical portion 62, from which the arms 70 project axially in a cantilever fashion; and
a collar 61 projecting radially in a cantilever fashion from portion 62 in a direction opposite to axis A and defining an axial end of the main body 60 opposite to ring 65.

In the case shown, the diameter of the main body 60 is equal to the diameter of ring 65.

The locking element 55 also comprises a ring 64 arranged axially in abutment against the collar 61 on the side of the bearing 17 and annularly touching the main body 60 on the side opposite to axis A.

The locking element 55 also comprises a plurality of appendages 75 extending axially in a cantilever fashion from the main body 60 and axially set apart from ring 65.

The appendages 75 define respective axial slots 76.

In the case shown, the appendages 75 are U-shaped. The appendages 75 also comprise two axial segments 71 projecting in a cantilever fashion from the main body 60 and a free connecting segment 72 between the arms 71.

In the case shown, segments 72 of the appendages 75 extend from respective segments 71, so as to be divergent with respect to axis A, proceeding parallel to axis A in a direction opposite to segments 71.

The appendages 75 are angularly and evenly spaced out from each other.

The appendages 75 and the arms 70 circumferentially variating with one another.

The appendages 75 are axially set apart and distinct from ring 65.

In the case shown, ring 65 is arranged axially between the main body 60 and the rolling bodies 32.

The anti-torque rotor 4 also comprises:
a ring 80 connected to ring 50 by a plurality, six in the case shown, of axial pins 82 angularly and evenly spaced out from each other, so as to be angularly fixed with respect to axis A and axially and integrally sliding with ring 50, the bearing 17 and the control rod 10;
a ring 85 angularly fixed with respect to axis A and axially and integrally sliding with ring 50, the bearing 17 and the control rod 10; and
a plurality of pins 81, four in the case shown, of radial extension, engaging respective slots 76 with axial play, fastened to ring 80 and arranged in axial abutment against ring 85.

In the case shown, portion 62 of the main body 60 is radially interposed between rings 80 and 85.

Referring to FIGS. 3 to 9, ring 80 is fastened to segment 26 of the main body 25 and these are axially interposed between a nut 29 screwed on the end 24 of the control rod 10 and the shoulder 28 of the control rod 10.

When arranged in the first or second emergency configuration (FIGS. 6 to 9), the locking element 55 can slide along axis A with respect to rings 85, 80, 31 and 30 and the control rod 10. This happens because the pins 81 engage the respective slots 76 with axial play.

When the locking element 55 is in the standard configuration (FIGS. 4 and 5), the pins 81 are arranged in axial abutment against respective axial ends 77 of the corresponding slots 76 arranged on the opposite side of the bearing 17 (FIG. 5).

Contrariwise, when arranged in the first or second emergency configuration (FIGS. 6 to 9), the locking element 55 can slide up to the extracted position, where the pins 81 are arranged in axial abutment against respective axial ends 78, opposite to ends 77, of the corresponding slots 76 arranged on the side of the bearing 17 (FIG. 7).

The anti-torque rotor 4 also comprises a spring 100 interposed between ring 50 and the locking element 55.

The spring 100 is configured to exert an elastic force on the locking element 55 directed parallel to axis A and oriented from the opposite side of the bearing 17. This force elastically preloads the locking element 55 towards the extracted position in FIGS. 6 to 9.

This elastic force is countered by the axial friction force opposing it, arising from the radial interference between ring 65 and surface 38, when the locking element 55 is in the inserted position, reached in the standard configuration (FIGS. 4 and 5).

Once the locking element 55 is arranged in this first or second emergency configuration, it is axially pushed by the spring 100 from the side opposite to the bearing 17 until it reaches the extracted position (FIGS. 6 to 9).

Reaching this extracted position is indicative of the failure condition of the bearing 17.

More specifically, the spring 100 is interposed between ring 64 integral with the locking element 55 and ring 85 in abutment against the pins 81.

In the case shown, the spring 100 is a wave spring.

In particular, the spring 100 comprises two annularly extending wave elements that axially cooperate with each other.

Figure 2:
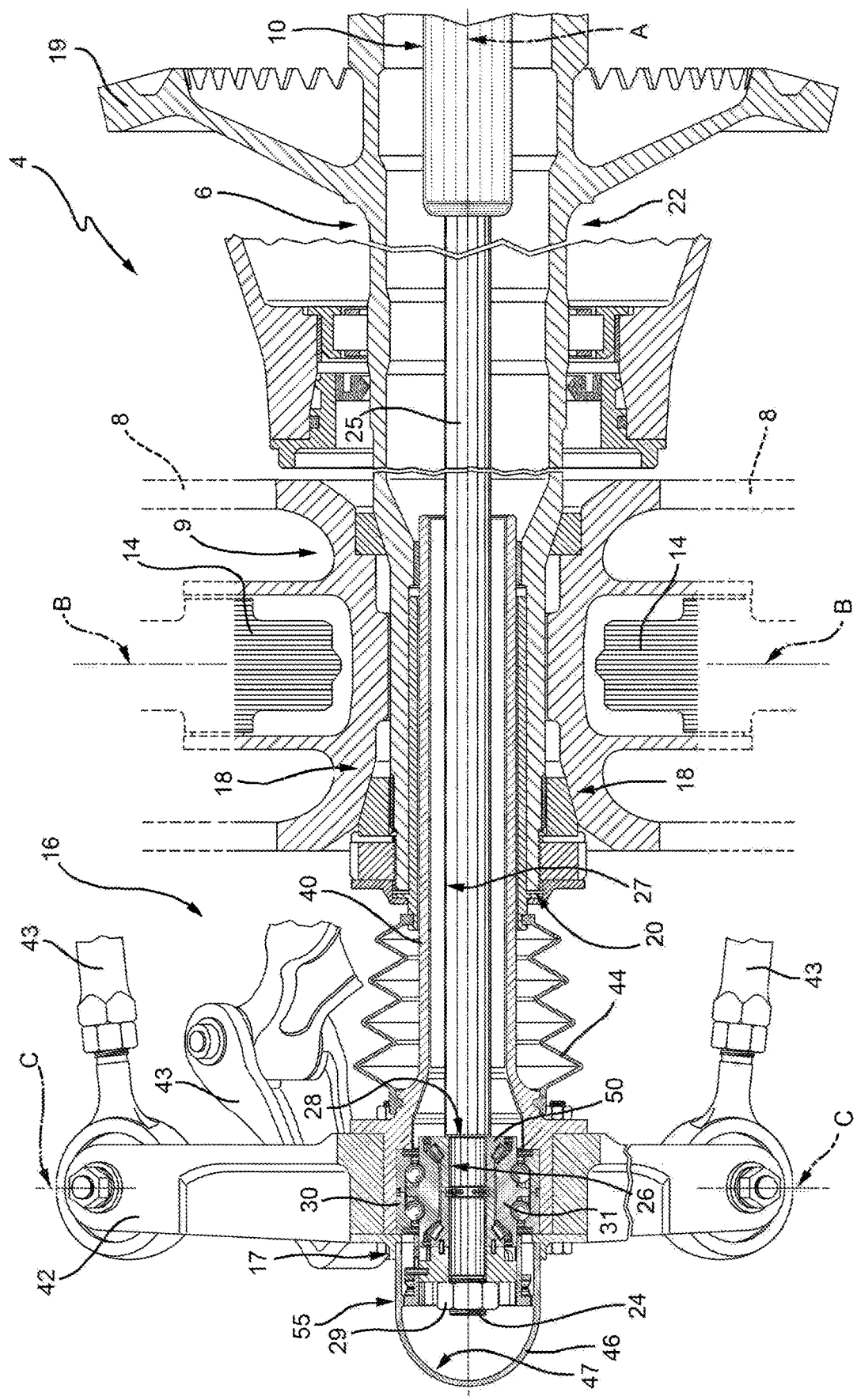
FIG. 2 is a section along line II-II of FIG. 1, on a highly enlarged scale and with some parts not shown for the sake of clarity.
Figure 3:
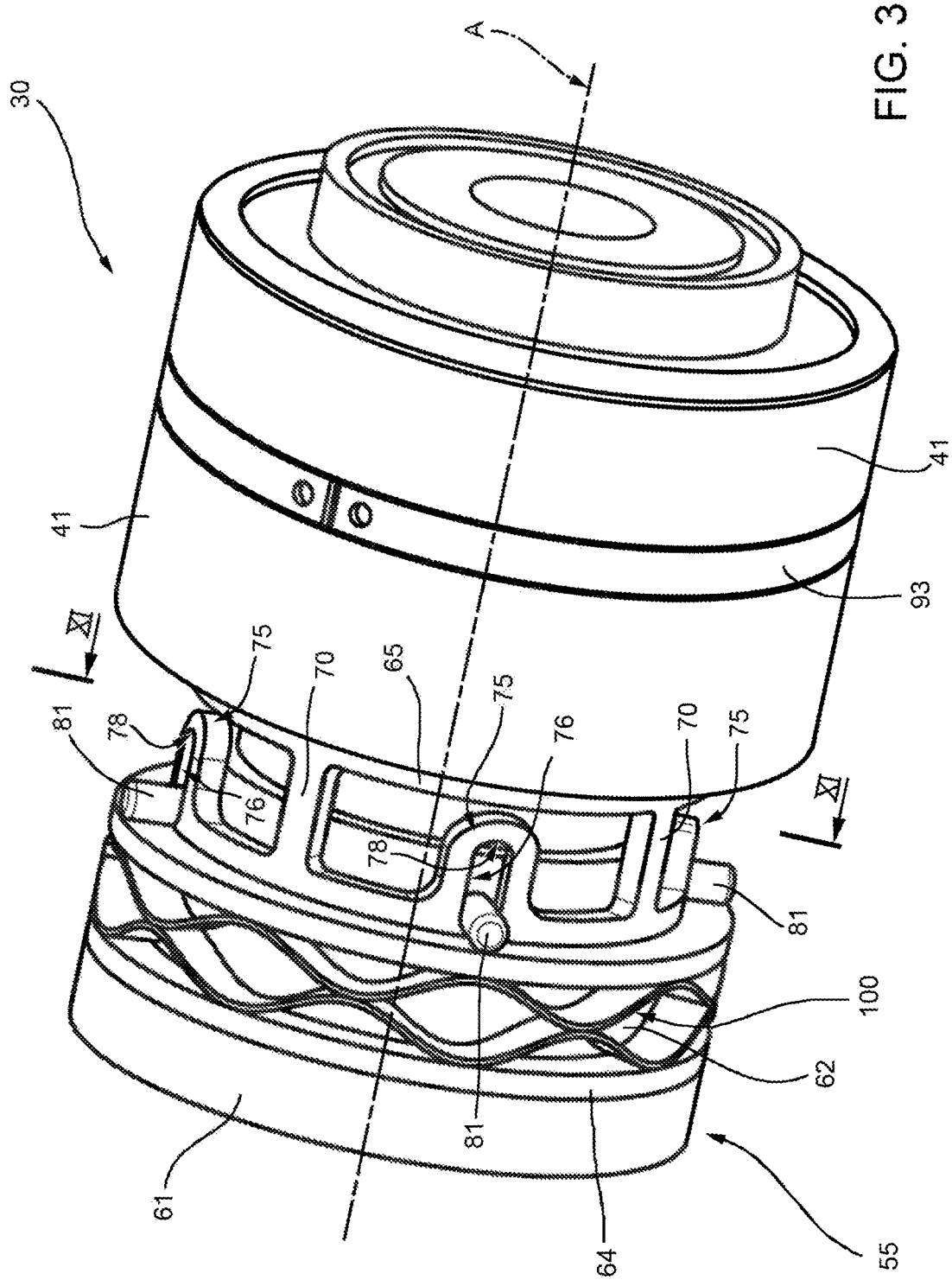
FIG. 3 is a perspective view, on a highly enlarged scale, of some components of the anti-torque rotor of FIGS. 1 and 2.

Referring to FIG. 2, the anti-torque rotor 4 also comprises a cover element 46 fastened to flange 42 and, consequently, rotatable about axis A with element 16.

The cover 46 defines a cavity 47 symmetrical with respect to axis A and housing the main body 60, the spring 100, the nut 29, the pins 81 and rings 80 and 85.

Preferably, the cover 46 is made of a transparent material and is visible from outside the helicopter 1.

Cover 46 is rotatable about axis A integrally with control element 16.

The locking element 55 also preferably comprises a coloured annular band (not shown in the accompanying figures).

This annular band is visible from the outside through the cover 46 when the locking element 55 is in the extracted position, so as to provide an immediate indication of the fact that the locking element 55 is in the extracted position.

Contrariwise, this annular band is not visible from the outside through the cover 46 when the locking element 55 is in the inserted position.

Referring to FIGS. 5, 7 and 9, the shoulder 37 of the bearing 17 is radially set apart from ring 30.

The outer diameter of the shoulder 37 is greater than the inner diameter of the tracks 33 and 34.

Due to this, in the event of failure of the bearing 17 that results in the destruction of the rolling bodies 32, translation of the control rod 10 towards track 33 brings shoulder 37 into abutment against track 33.

Similarly, translation of the control rod 10 towards track 34 brings shoulder 37 into abutment against track 34.

The condition of contact in the axial direction of shoulder 37 against tracks 33 and 34 makes the set formed by the control rod 10 and rings 31 and 50 again able to slide along axis A integrally with ring 30, thereby preserving the controllability of the anti-torque rotor 4.

Furthermore, the shoulder 37 is axially set apart from the cages 39 of the rolling bodies 32.

The bearing 17 also comprises an annular insert 93 axially interposed between half-rings 31 and arranged on the radially outer surface of ring 30.

The backup bearing 54 also comprises an annular insert 94 interposed between half-rings 45 and arranged on the radially inner surface 58 of ring 50.

Operation of the anti-torque rotor 4 is described hereinafter starting from a condition (FIGS. 2, 4 and 5) in which the bearing 17 functions correctly and the locking element 55 is arranged in the standard configuration and in the inserted position.

In this condition, operation of the flight control 15 causes translation of the control rod 10 in a given direction along axis A.

This translation causes integral translation of the bearing 17 and element 16 along axis A.

Consequently, element 16 moves away from (or closer to) the blades 8 and varies the inclination of the levers 43 with respect to axis B, increasing (or decreasing) the angle of attack of the blades 8.

This movement of the levers 43 causes the simultaneous rotation by equal angles of the blades 8 about the associated axes B and the consequent adjustment of the angles of attack of the blades 8.

The bearing 17 enables rotation of element 16 with respect to the control rod 10 about axis A.

In greater detail, ring 30 rotates integrally with element 16 about axis A and rings 31 and 50 remain fixed with respect to axis A.

This happens because ring 65 is pressed on ring 31 with radial interference, preventing rotation of the latter and, consequently, also of ring 50.

Axial friction force generated by this interference assembly is greater than the elastic force applied by the spring 100 on the locking element 55.

In this condition, ring 50, and consequently the backup bearing 54, are substantially inactive.

In the event of failure of the bearing 17, that results in an increase in temperature in the area of the bearing 17 above a respective threshold value, the radial thermal dilation of ring 65 is greater than the thermal dilation of ring 31.

Consequently, the locking element 55 moves to the first emergency configuration (FIGS. 6 and 7), in which ring 65 is set apart from ring 31.

Ring 31 can thus rotate about axis A with respect to ring 50, which instead remains angularly fixed about axis A, as it is blocked on the control rod 10.

In this condition, ring 31 and the bearing 17 are substantially inactive and the rotation of element 16 with respect to the control rod 10 about axis A is enabled by the backup bearing 54.

In the event of failure of the bearing 17 that results in an increase in the torque transmitted from ring 31 to ring 30 and/or in the vibrations in the area of the bearing 17 above respective threshold values, the torsional breakage of the arms 70 is induced.

This breakage places the locking element 55 in the second emergency configuration (FIGS. 8 and 9).

Similarly to the first emergency configuration, ring 31 can thus rotate about axis A with respect to ring 50, which instead remains angularly fixed about axis A.

Furthermore, ring 31 and the bearing 17 are substantially inactive and the rotation of element 16 with respect to the control rod 10 about axis A is enabled by the backup bearing 54.

Once set in the first or second configuration, the locking element 55 is pushed by the spring 100 towards the extracted position (FIGS. 6 to 9).

This sliding causes the movement of the slots 76 with respect to the pins 81 and ring 85.

In the extracted position, the annular band of the locking element 55 is visible from outside the helicopter 1, visually informing the pilot or inspection engineer that the bearing 17 is in an incipient or effective failure condition.

In the event of failure of the bearing 17 that results in the destruction of the rolling bodies 32, the translation of the control rod 10 towards track 33 (34) brings shoulder 37 into abutment against track 33 (34), maintaining two-way axial contact between the control rod 10 and the bearing 17, thereby ensuring the controllability of the anti-torque rotor 4.

Figure 12:
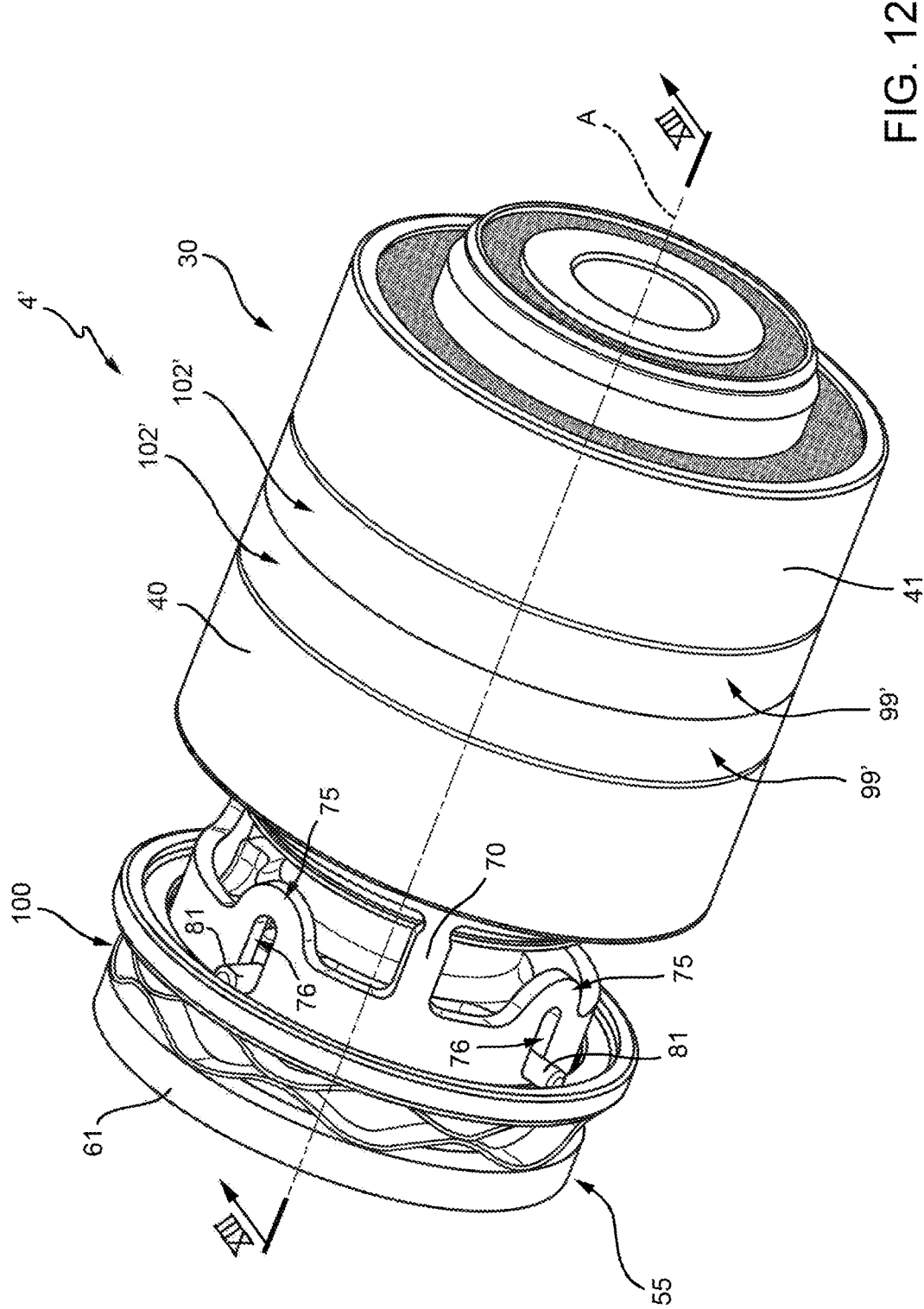
FIG. 12 is a perspective view, on a highly enlarged scale, of some components of the anti-torque rotor according to a second embodiment of the invention in the standard configuration.
Figure 13:
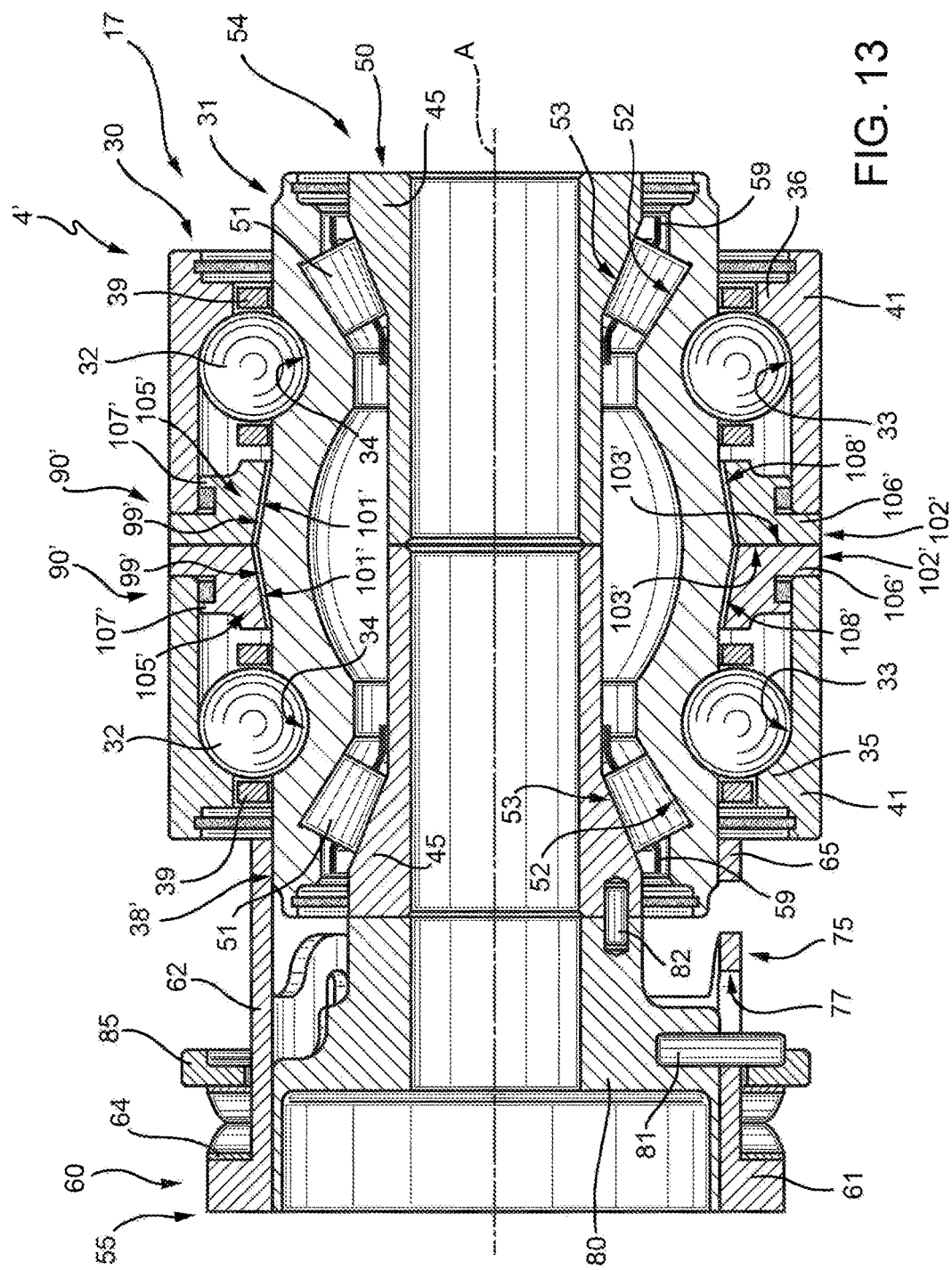
FIG. 13 is a section along line XII-XII of FIG. 12.

With reference to FIGS. 12 and 13, reference numeral 4' indicates an anti-torque rotor according to a second embodiment of the present invention.

Rotor 4' is similar to rotor 4 and only the differences from the latter will be described hereinafter; identical or equivalent parts of the rotor 4, 4' will be marked, where possible, with the same reference numerals.

Rotor 4' differs from rotor 4 for not comprising shoulder 37.

Furthermore, rotor 4' differs from rotor 4 for comprising a pair of blocking elements 90' axially interposed between shoulders 35, 36.

Rotor 4' also differs from rotor 4 in that surface 38' comprises a pair of stretches 99' axially interposed between rolling bodies 32.

Stretches 99' are axially consecutive and symmetrically converge towards one another on the opposite side of axis A with respect to the respective remaining parts of surface 38'.

Stretches 99' are planar, so as to define a chevron towards blocking elements 90'.

Blocking elements 90' are fixed to ring 30.

In the normal configuration, bearing 17 does not allow any axial movement between rings 30, 31.

In this normal configuration, blocking elements 90' integrally rotate with ring 30 with respect to ring 31.

Furthermore, blocking elements 90' are spaced by respective stretches 99' by means of respective clearances 108'.

Differently, in the event of damage of tracks 33, 34 of rolling bodies 32—this phenomenon is known in the art as "spalling"—, a certain axial movement is allowed between rings 30, 31.

In this condition, blocking elements 90' engage with contact respective surfaces 99', thus substantially reducing or even substantially preventing the wear between rings 30, 31.

In greater detail, blocking elements 90' are axially interposed between rolling bodies 32.

Each blocking element 90' comprises a respective radially inner surface 101' tapered with respect to axis A.

Furthermore, each blocking element 90' is bound by a respective radially outer surface 102' radially opposite to respective inner surface 101' with respect to axis A.

The size of surface 101' parallel to axis is greater than surface 102' parallel to axis A.

Each element 90' is further bound by a respective radial surface 103', which extends between and is in contact with respective surfaces 101', 102'.

Each element 90' also comprises:
- a respective main body 105' defining surfaces 101', 102', 103';
- a respective radial shoulder 106', which protrudes from body 105' and is bound by surfaces 102', 103'; and
- a further respective radial shoulder 107', which protrudes from body 105', is axially spaced from respective shoulder 106' and bounds blocking element 90' on the axial opposite side with respect to respective surface 103'.

The radial size of shoulder 106' relative to axis A is larger than the radial size of shoulder 107' relative to axis A.

Shoulder 106' of each blocking element 90' is axially interposed between respective shoulder 107' and surface 103'.

Blocking elements 90', respective clearances 108' and respective surfaces 101' are symmetrically arranged with respect to a plane orthogonal to axis A.

In particular, surfaces 103' of respective elements 90' axially abut against one another parallel to axis A and lie on a plane orthogonal to axis A.

Surfaces 101' symmetrically diverge from one another proceeding and towards axis A starting of respective surfaces 103' towards respective shoulders 107'.

Clearances 108' diverge from one another starting of respective surfaces 103' towards respective shoulders 107'.

Shoulders 106' and 107' contact respective half-rings 41 of ring 30.

Still more precisely, shoulders 106' are axially interposed between half-rings 41.

Shoulders 107' radially abut against radially inner surfaces 109' of respective half-rings 41.

The operation of rotor 4' differs from the operation of rotor 4 in that blocking elements 90' rotate with ring 30 about axis A relative to stationary ring 31 and are spaced from relative stretches 99' by means of relative clearances 108', when bearing 17 correctly operates and locking element 55 is in the standard configuration and in the inserted position.

In this condition, bearing 17 substantially prevents any axial movement between rings 30, 31.

Differently, in the event of failure of bearing 17 due to damage of tracks 33, 34 of rolling bodies 32—this phenomenon is known in the art as "spalling"—, a certain axial movement might be allowed between rings 30, 31.

However, in this condition, blocking elements 90' block against relative stretches 99' of ring 31, thus preventing this axial movement and the resulting wear, heat generation and potential damage of rings 30, 31.

In particular, the axial displacement of ring 31 is caused by the movement of control rod 10 due to the pilot action.

With reference to FIGS. 14 to 17, reference numeral 4" indicates an anti-torque rotor according to a third embodiment of the present invention.

Rotor 4" is similar to rotor 4 and only the differences from the latter will be described hereinafter; identical or equivalent parts of the rotor 4, 4" will be marked, where possible, with the same reference numerals.

Rotor 4" differs from rotor 4 in that rings 50", 31" and rolling bodies 51" form bearing 17".

Differently, rings 31", 30" and rolling bodies 32" form back-up bearing 54".

In the embodiment shown, rolling bodies 51" roll on respective tracks 52", 53" of respective rings 31", 50". Furthermore, rolling bodies 51" form two axially spaced rings of tapered rollers.

Rolling bodies 51" are, in the embodiment shown, axially pre-loaded and are tapered rollers.

Rolling bodies 32" roll on respective tracks 33", 34" of respective rings 30", 31". In the embodiment shown, rolling bodies 32" form two axially spaced rings of tapered rollers.

Rolling bodies 32" are, in the embodiment shown, axially pre-loaded and axially interposed between rolling bodies 51".

Radially outer surface 57" of ring 50" comprises a pair of stretches 98" defining respective tracks 53" and a pair of stretches 99" axially interposed between stretches 98".

Stretches 99" are axially consecutive and symmetrically converge towards one another on the side of axis A with respect to the remaining part of surface 57".

Stretches 99" are planar, so as to define a chevron.

Ring 31" comprises, in turn:
- a central body 120"; and
- a pair of lateral protrusions 101" axially opposite to another and protruding from respective opposite axial sides of body 120".

Body 120" is bound by a pair or radially inner surfaces 103", which converge towards one another on the side of axis A and face respective stretches 99".

In detail, surfaces 103" are radially external with respect to relative stretches 99".

When bearing 17" correctly operates and locking element 55" is in the standard configuration and in the inserted position, surfaces 103" are separated from respective stretches 99" of ring 50" by respective clearances 108".

Surfaces 103", clearances 108" and stretches 99" symmetrically extend with respect to a plane orthogonal to axis A.

Differently, in the event of failure of bearing 17" due to damage of tracks 52", 53" of rolling bodies 51"—this phenomenon is known in the art as "spalling"—, a certain axial movement might be allowed between rings 50", 31".

However, in this condition, surfaces 103" axially block against relative stretches 99' of ring 31", thus preventing this axial movement and the resulting wear, heat generation and potential damage of rings 50", 31".

Protrusions 101" define, on respective radially outer surfaces, respective tracks 34" and, on respective radially inner surfaces, respective tracks 52".

Figure 14:
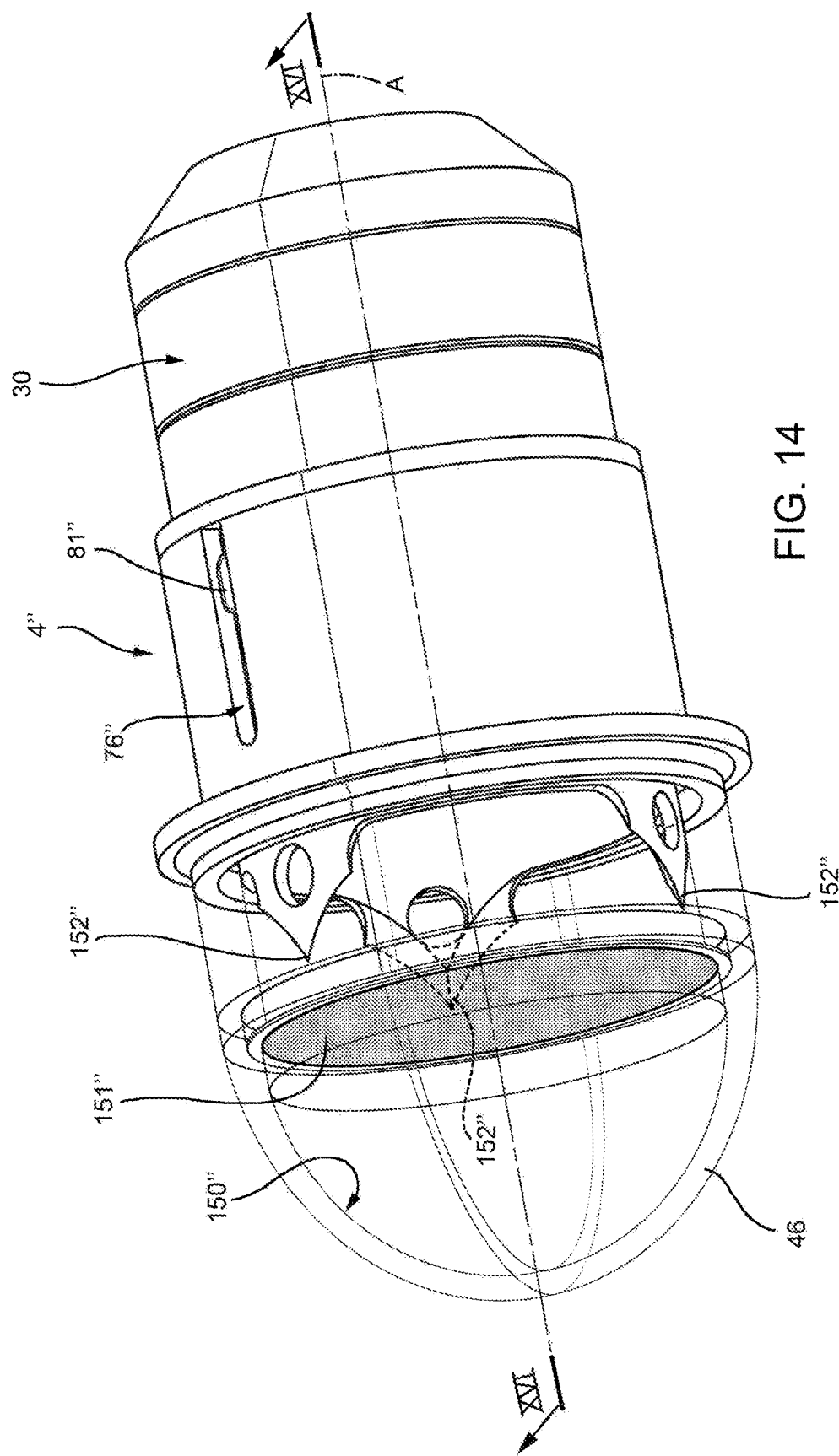
FIG. 14 is a perspective view, on a highly enlarged scale, of some components of the anti-torque rotor according to a third embodiment of the present invention in the standard configuration.
Figure 16:
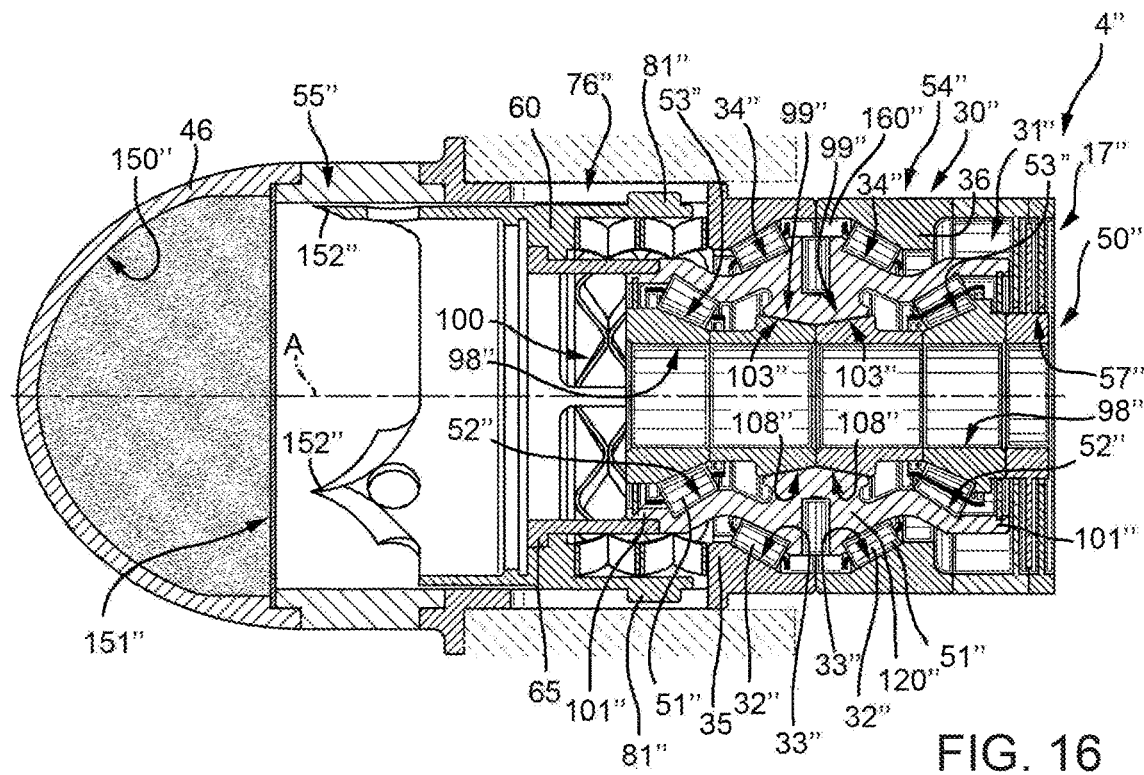
FIGS. 16 and 17 are section taken along lines XV-XV and XVI-XVI respectively of FIGS. 14 and 15.

Rotor 4" also differs from rotor 4 in that, when arranged in the standard configuration and in the inserted position shown in FIGS. 14 and 16, locking element 55" prevents the relative rotation of rings 30", 31" and allows the relative rotation between the assembly formed by rings 30", 31" and stationary ring 50", when bearing 17" is in normal operative condition.

In this condition, ring 50" is angularly stationary with respect to axis A whereas ring 31", 30" rotate about axis A.

In such condition, the rotation among rings 50" and 30", 31" could be lubricated by grease.

Figure 15:
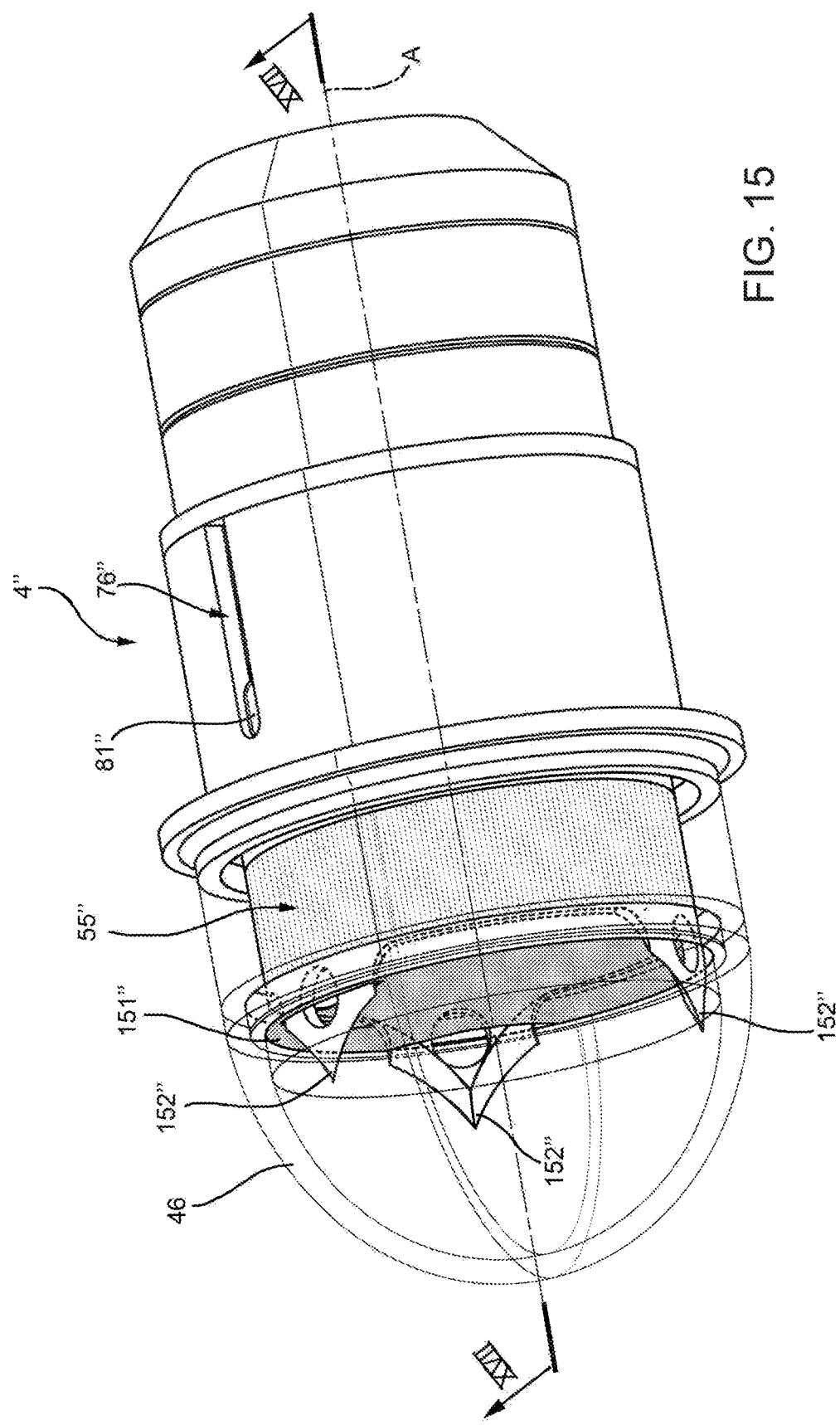
FIG. 15 is a perspective view of the third embodiment of the anti-torque rotor in one of the first and second emergency configuration.
Figure 17:
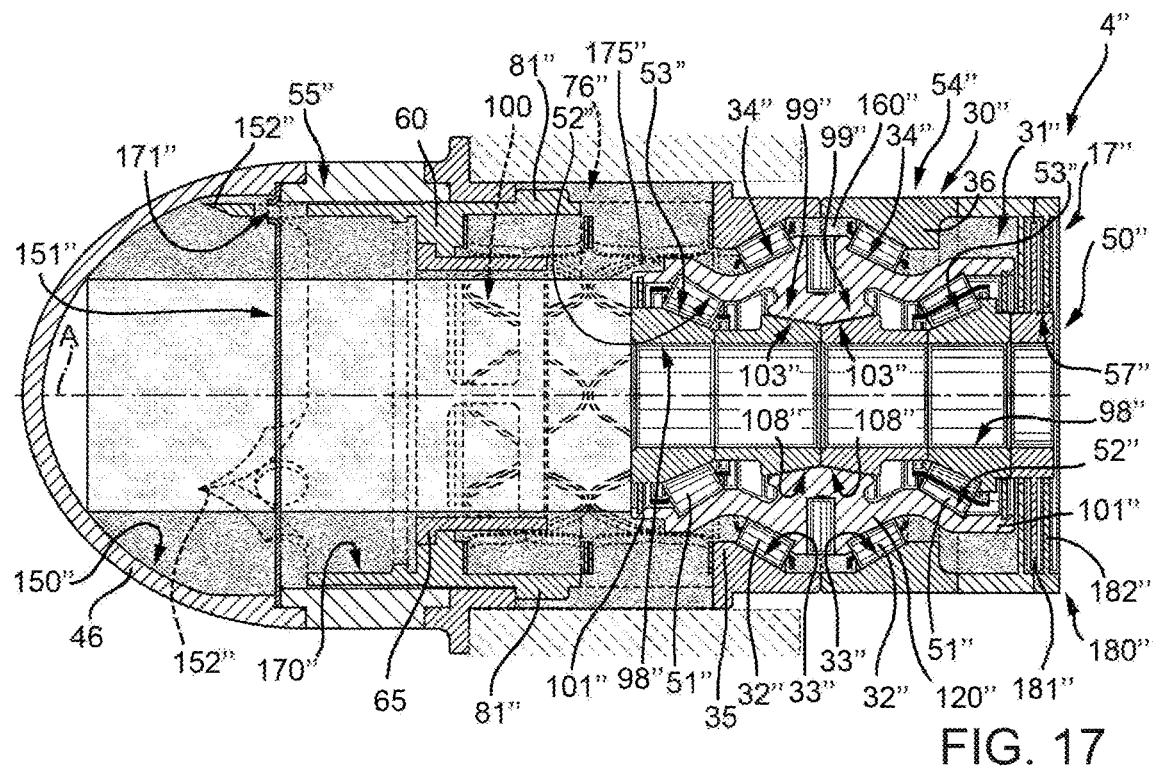

Furthermore, locking element 55", when set arranged in the first or second emergency configuration and in the extracted position shown in FIGS. 15 and 17, renders rings 31", 50" integral to one another about axis A and allows the rotation of ring 30" about axis A and relative to the stationary assembly formed by rings 31", 50", when bearing 17" is in the failure condition. Accordingly, when bearing 17" is in the failure condition, rings 50", 31" are angularly stationary with respect to axis A whereas ring 30" rotate about axis A.

In this condition, rings 31", 30" define back-up bearing 54".

Locking element 55" differs from locking element 55 for rotating about axis A integrally together with spring 100 and cover 46.

In particular, locking element 55" comprises a plurality of pins 81" similar to pins 81 integrally rotating with cover 46 and engaging with an axial play respective slots 76" similar to slots 76 integrally rotating with cover 46.

Rotor 4" further differs from rotor 4 for advantageously comprising:
- a tank 150" filled with a lubricant fluid;
- a breakable element 151" which bounds tank 150" on the side of rings 30", 31", 50"; and
- a plurality of punching elements 152" carried by locking elements 55";
- punching elements 152" are spaced from breakable element 151", when locking element 55" is in the inserted position (FIGS. 14 and 16), and punch breakable element 151" when locking element 55" is in the extracted position (FIGS. 15 and 17).

Breakable element 151" fluidly isolates tank 150" and rolling bodies 32" when locking element 55" is in the inserted position (FIGS. 14 and 16), and fluidly connects tank 150" and rolling bodies 32" when locking element 55" is in the extracted position (FIGS. 15 and 17).

In detail, tank 150" is defined by cover 46 and extends annularly about axis A.

Breakable element 151" extends parallel to axis A and closes tank 150" on the opposite side of cover 46, when locking element 55" is in the inserted position.

In the embodiment shown, breakable elements 151" is a discoidal membrane, preferably made of Aluminum.

Punching elements 152" protrude from body 60 of locking elements 55" on the axial opposite side with respect to ring 65.

In the embodiment shown, punching element 152" are angularly spaced about axis A.

As shown in FIG. 15, punching elements 152" are shaped as relative lances with convergent shaped sharp tips, proceeding from body 60 towards breakable element 151".

Preferably, punching elements 152" are radially outer with respect element 65 and define a radially outer periphery of element 55".

In the embodiment shown, body 60 and punching elements 152" are made of Titanium.

Ring 65 and arms 70 are made of Aluminum, in the embodiment shown.

When locking element 55" is in the extracted position shown in FIG. 17, rotor 4" defines a fluidic path 170" from tank 150" to a region 160" surrounding rolling bodies 32".

In detail, region 160" is radially bound between rings 30", 31".

Region 160" is axially bound between shoulders 35, 36 on the opposite radial side with respect to axis A and between protrusions 101" on the side of axis A.

With reference to FIG. 17, fluidic path 170" extends at radial periphery of rotor 4". Furthermore, path 170" comprises a plurality of through openings 171" axially extending through broken elements 152", a passage 175" between rings 65, 31" and a passage 176" between rings 31", 30". Differently, when locking element 55" is in the extracted position shown in FIG. 17, fluidic path 170" is interrupted by breakable element 151".

Rotor 4" also comprises a labyrinth seal 180" arranged on the opposite axial side of rolling bodies 32" with respect to breakable element 102" and adapted to tight close fluidic path 170" and to keep lubricant fluid in continuous contact with rolling bodies 32", when locking element 55" is in the extracted position.

In detail, labyrinth seal 180' comprises (FIG. 17):
- a seal 181" radially interposed between rings 50", 31" on the opposite axial side with respect to element 55"; and
- a seal 182" radially interposed between rings 50", 30" on the opposite axial side of seal 181" with respect to rolling bodies 32".

In particular, seals 181", 182" are shaped as annuluses. Seal 182" has a radial size greater than seal 181", in the embodiment shown.

The operation of rotor 4" differs from the operation of rotor 4 in that locking element 55" integrally rotates with cover 46 and ring 30" about axis A, thanks to the connection between the pins and the respective slots.

When the locking element 55" is in the inserted position and in the standard configuration of FIGS. 14 and 16, bearing 17" formed by rings 50", 31" and rolling bodies 51" enables rotation of element 16 with respect to rod 10 about axis A.

In greater detail, ring 50" is stationary about axis A and rings 31", 30" rotate integrally about axis A. In this condition, locking element 55" is in contact with ring 31" and angularly integral with ring 31".

Furthermore, back-up bearing 54" is substantially inactive.

Punching elements 152" are spaced from breakable element 151", which is still unbroken.

Accordingly, lubricant fluid remains in tank 150"

In the event of failure of bearing 17" which results in an increase in the temperature of bearing 17" above the threshold value or in an increase of the torque transmitted from ring 31" to ring 50" and/or in the vibrations in the area of bearing 17" above respective values, locking element 55" is displaced in the first or second emergency configuration shown in FIGS. 15 and 17.

Accordingly, spring 100 displaces locking element 55" in the extracted position shown in FIGS. 15 and 17.

In this condition, ring 31" remains angularly stationary and rolling bodies 32" allow the rotation of ring 30" relative to ring 31" and about axis A.

Furthermore, punching elements 152" break breakable element 151". In this way, the lubricant fluid contained in tank 150" can flow along fluidic path 170" from tank 150" to region 160" and ensure a continuous lubrication of rolling bodies 32".

More precisely, lubricant fluid flow through passages 171" through broken breakable element 151" and through passage 172" between rings 65, 31".

The rotation of locking element 55", cover 45 and rings 31", 30" generates, for centrifugal action, a lubricant fluid bath (shown in grey in FIG. 17) in the peripheral region of rotor 4" whereat rolling bodies 32" are arranged, as shown in FIG. 17.

Labyrinth seal 180" is effective in containing the lubricant fluid in region 160" Regardless the configuration of locking element 55", normal blocking surfaces 103" rotate with ring 31" about axis A relative to stationary ring 50" and are spaced from relative stretches 99" by means of relative clearances 108".

In this condition, bearing 17" substantially prevents any axial movement between rings 50", 31".

Differently, in the event of failure of bearing 17" due to damage of tracks 53", 52" of rolling bodies 51"—this phenomenon is known in the art as "spalling"—, a certain axial movement might be allowed between rings 50", 31".

However, in this condition, surfaces 103" of ring 31" block against relative stretches 99" of ring 50", thus preventing this axial movement and the resulting wear, heat generation and potential damage of rings 50", 31".

From an examination of the characteristics of the anti-torque rotor 4, 4', 4" according to the present invention, the advantages that can be achieved therewith are evident.

In greater detail, the locking element 55 prevents the relative rotation of rings 31 and 50 in the standard configuration (FIGS. 4 and 5), and enables the rotation of ring 31 with respect to ring 50 in the first and second emergency configurations (FIGS. 6 to 9), when the bearing 17 is in incipient or effective failure.

In this way, in the event of incipient or effective failure that results in the seizing, even if only partial, of the bearing 17, rings 30 and 31 rotate integrally with one another with respect to ring 50, thus allowing to preserve the possibility of regulating the angles of attack of the blades 8 via the control rod 10. In other words, in the event of failure, the bearing 17 becomes inactive and the backup bearing 54 is automatically activated.

In greater detail, in the case of increased temperature in the area of the bearing 17, the locking element 55 moves from the standard configuration to the first emergency configuration.

More specifically, by having a larger thermal dilation coefficient, ring 65 disengages from surface 38 of ring 31, which has a lower thermal dilation coefficient.

In the case where the torque acting on ring 31 or the vibrations in the area of the bearing 17 exceed the respective threshold values, the locking element 55 moves from the standard configuration to the second emergency configuration.

More specifically, the arms 70 break under torsion.

In this way, rings 31 and 30 rotate with respect to ring 50, when the temperature in the area of the bearing 17 exceeds the respective threshold value and/or when the torque improperly acting of ring 31 or the vibrations in the area of the bearing 17 exceed the respective threshold values.

Furthermore, the locking element 55 is arranged in the extracted position when it reaches the first or second standard configuration.

In this way, it is possible to recognise the incipient or effective state of failure of the bearing 17 simply on the basis of the axial position of the locking element 55 with respect to the control rod 10.

The spring 100 elastically preloads the locking element 55 towards the extracted position, favouring reaching this position quickly.

When the locking element 55 is in the extracted position, the band is visible from outside the helicopter 1 to the crew and/or inspection engineers through the transparent cover 46, thereby providing a clear and immediate indication that the bearing 17 is in a failure condition.

The shoulder 37 has an outer diameter greater than tracks 33 and 34 of the bearing 17.

Due to this, in the event of failure of the bearing 17 that results in the destruction of the rolling bodies 32, translation of the control rod 10 towards track 33 or 34 brings shoulder 37 into abutment against track 33 or 34, preserving the controllability of the anti-torque rotor 4, 4'.

Rotor 4' (FIGS. 12 and 13) further comprises a pair of blocking element 90' carried by ring 30 and provided with respective tapering surfaces 101'.

Surfaces 101' are spaced from respective stretches 99' of ring 31, when bearing 17 is in the normal operative condition.

Differently, surfaces 101' block blocking elements 90' integral with ring 30 against respective stretches 99' of ring 31 in the event of failure of bearing 17 due to damage of tracks 33, 34 of rolling bodies 32.

In this way, also when tracks 33, 34 are damaged, any relative axial movement between rings 30, 31 is substantially prevented.

Accordingly, the risk of wear of heat generation and resulting damage of rings 30, 31 is substantially avoided.

Locking element 55" of rotor 4" allows the relative rotation of ring 31" relative to ring 50" in the standard configuration (FIGS. 14 and 16), and enables the relative rotation of ring 30" with respect to ring 31" in the first and second emergency configurations (FIGS. 15 to 17), when the bearing 17" is in incipient or effective failure.

In this way, locking element 55" of rotor 4" achieves substantially the same advantages as locking element 55 of rotor 4.

Furthermore, locking element 55" comprises a plurality of punching elements 152", which break breakable elements 151", when locking element 55" is set in the extracted position and in case of failure of bearing 17".

In this way, the lubricant fluid contained in tank 150" can flow along fluidic line 170" towards rolling bodies 32" and ensure their proper operation of back-up bearing 54".

The rotation of cover 46, locking element 55" and ring 30" about axis A thrusts, for centrifugal action, the lubricant fluid towards rolling bodies 32" which are arranged radially outer than rolling bodies 51".

In this way, the centrifugal action generates a lubricant fluid bath in the peripheral region of rotor 4" whereat rolling bodies 32" and region 160" are arranged.

Labyrinth seal 180" is effective in containing the lubricant fluid in region 160".

Similarly to rotor 4', surfaces 103" of ring 31" are spaced from respective stretches 99" of ring 30", when bearing 17" is in the normal operative condition.

Differently, surfaces 103" block against respective stretches 99" in the event of failure of bearing 17" due to damage of tracks 52, 53 of rolling bodies 51".

In this way, also tracks 52, 53 of rolling bodies 51" are damaged, any axial relative movement between rings 50", 31" is substantially prevented.

Accordingly, the risk of wear of heat generation and resulting damage of rings 50", 31" is substantially avoided.

Rings 30, 30"; 31, 31"; 50, 50" of rotors 4, 4', 4" are coaxial and extends about common axis A.

Still more precisely, rings 50, 50" are radially inner with respect to rings 31, 31", which are, in turn, radially inner with respect to rings 30, 30".

Accordingly, bearing 17, 17"; 54, 54" of rotor 4, 4', 4" are particularly compact radially to axis A in comparison with the solution shown in U.S. Pat. No. 9,359,073 and discussed in the introductory part of the present description.

In this way, tracks 52", 53", 33", 34" can be coaxially mounted inside rotor 4, 4', 4" with a very limited axial size, thus rendering substantially unnecessary any re-design of rotor 4, 4" differently from the solution shown in U.S. Pat. No. 9,359,073.

Furthermore, tracks 52", 53", 33", 34" are defined by only three rings 30, 30"; 31, 31"; 50, 50", instead of the four rings disclosed in U.S. Pat. No. 9,359,073.

Being rings 30, 30"; 31, 31"; 50, 50" coaxial, bearing 17, 17", 54, 54" are capable of transmitting translation loads along a first direction parallel to axis A and a second and a third direction orthogonal to axis A as well as rotational loads about the second and the third direction.

Differently, the bearings disclosed in U.S. Pat. No. 9,359,073 are effective to transmit only axial load parallel to the rotation direction of the mast.

Furthermore, bearing 17, 17"; 54, 54" comprise two rings of rolling bodies 32, 32"; 51, 51".

In this way, rolling bodies 32, 32"; 51, 51" can be easily axially pre-loaded, thus strongly containing the axial play and the resulting vibrations and noise.

Rolling bodies 51, 51" are conical roller. In this way, bearing 17, 17"; 54, 54" are substantially not exposed to false brinelling damage mechanism.

Finally, it is clear that modifications and variants can be made with regard to the anti-torque rotor 4, 4', 4" described and illustrated herein without departing from the scope defined by the claims.

In particular, ring 50 could be arranged radially external to ring 30.

Moreover, the locking element 55 could comprise a plurality of radial pins interposed between ring 65 and surface 38. These pins would be breakable if the torque transmitted from ring 30 to ring 31 and/or the vibrations in the area of the bearing 17 exceed the respective threshold values. These pins would also be made of a material having a particularly low torsional resistance above the threshold value.

The locking element 55 could also comprise brazing between rings 31 and 50 and sized so as to enable rotation between rings 31 and 50 when the torque transmitted from ring 30 or the vibrations in the area of the bearing 17 exceed the respective threshold values. Furthermore, the brazing would be made using a material that would enable rotation of ring 31 with respect to ring 50 upon exceeding the temperature threshold value.

The rolling bodies 32, 32" and 51, 51" could also be needle rollers, spherical rollers, self-aligning ball bearings, or plain ball bearings.

The rolling bodies 32, 32" and 51, 51" could also have a "O" (back to back) arrangement instead of a "X" (face to face) arrangement.

The invention claimed is:

1. An anti-torque rotor for a helicopter comprising:
   a mast rotatable about a first axis (A);
   a plurality of blades, hinged on said mast, extending along respective transverse axes (B) that are transverse to said first axis (A) and rotatable about respective said transverse axes (B) to vary respective angles of attack of the plurality of blades;
   an element, configured to slide along said first axis (A) with respect to said mast, jointly rotating with said mast, and operatively connected to said blades to cause the rotation of said blades about respective said transverse axes (B) following a translation of said element along said axis (A);
   a control rod, configured to slide axially along said first axis (A) with respect to said mast and angularly fixed with respect to said first axis (A); and
   a first bearing interposed between said control rod and said element, configured to slide along said first axis (A) with respect to said mast and configured to slide jointly with said control rod, and configured to enable the relative rotation of said element with respect to said control rod about said first axis (A) in a normal operating condition;
   said first bearing, in turn, comprising:
   a first ring rotatable integrally with said element about said first axis (A);
   a second ring radially internal to said first ring with respect to said first axis (A) and configured to slide integrally with said control rod along said first axis (A);
   a plurality of first rolling bodies, which are interposed between said first and second rings and adapted to roll on respective first tracks of said first and second rings;
   said rotor further comprising:
   a third ring slidable integrally with said control rod along said first axis (A) and angularly fixed with respect to said first axis (A);
   a plurality of second rolling bodies, which are interposed between said second and third rings and are adapted to roll on respective second tracks of said second and third rings; and
   a locking element having a standard configuration, wherein the locking element prevents the relative rotation of said second and third rings, when said first bearing is, in use, in a normal operating condition;
   said locking element being movable from said standard configuration to at least one emergency configuration, wherein said locking element makes said second ring free to rotate with respect to said third ring about said axis (A), when said first bearing is, in use, in a failure condition;
   wherein said second ring comprises a radially outer surface with at least one tapered stretch axially interposed between said first rolling bodies;
   said first ring comprising at least one blocking element with at least one tapered first surface radially facing said at least one tapered stretch and separated from said at least one tapered stretch by a clearance, when said first bearing is, in use, in said normal operation.

2. The anti-torque rotor of claim 1, wherein said at least one blocking element contacts said at least one tapered stretch, in case of damage of said first tracks of said rolling bodies.

3. The anti-torque rotor of claim 1, wherein said blocking element is fixed to said first ring.

4. The anti-torque rotor of claim 1, wherein said at least one tapered first surface and said at least one tapered stretch are parallel to one another.

5. The anti-torque rotor of claim 1, wherein said at least one blocking element comprises:
   a radially outer second surface radially opposite with respect to said first axis (A) and radially opposite to said first surface; and
   a radial third surface which extends between said first and second surface.

6. The anti-torque rotor of claim 5, wherein said at least one blocking element further comprises:
   a main body defining said first, second and third surfaces;
   a first radial shoulder, which protrudes from said body and is radially bound by said second surface and third surface; and a second radial shoulder, which protrudes from said body, is axially spaced from respective first radial shoulder and bounds the said blocking element on the axial opposite side with respect to said third surface.

7. The anti-torque rotor of claim 6, wherein said first radial shoulders are axially interposed between respective half-rings of said first ring; said second radial shoulders being in radial contact against said half-rings.

8. The anti-torque rotor of claim 1, further comprising:
 a pair of said blocking elements with respective said tapered first surfaces and in axial contact with one another;
 a pair of said first stretches associated to respective said pair of blocking elements; and
 a pair of said clearances interposed each, between a respective said first stretch and a respective said tapered first surface of a respective said blocking element of said pair of blocking elements.

9. The anti-torque rotor of claim 8, wherein said blocking elements are symmetrically mounted with respect to a plane orthogonal to said first axis (A).

10. The anti-torque rotor of claim 8, wherein said first surfaces converge towards one another on the opposite side of said first axis (A).

11. The anti-torque rotor of claim 8, wherein said third surfaces of respective said blocking elements axially abut against one another.

12. The anti-rotor of claim 8, wherein said blocking elements are interposed between said first rolling bodies.

13. A helicopter comprising:
 a fuselage;
 a main rotor; and
 an anti-torque rotor according to claim 1.

* * * * *